(12) United States Patent
Walton et al.

(10) Patent No.: US 9,154,274 B2
(45) Date of Patent: Oct. 6, 2015

(54) OFDM COMMUNICATION SYSTEM WITH MULTIPLE OFDM SYMBOL SIZES

(71) Applicant: QUALCOMM Incorporated, San Diego, CA (US)

(72) Inventors: Jay Rod Walton, Carlisle, MA (US); John W. Ketchum, Harvard, MA (US); Mark Wallace, Bedford, MA (US); Steven J. Howard, Ashland, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/920,971

(22) Filed: Jun. 18, 2013

(65) Prior Publication Data

US 2013/0279614 A1 Oct. 24, 2013

Related U.S. Application Data

(63) Continuation of application No. 10/375,162, filed on Feb. 25, 2003, now abandoned.

(60) Provisional application No. 60/421,309, filed on Oct. 25, 2002, provisional application No. 60/438,601, filed on Jan. 7, 2003.

(51) Int. Cl.
*H04L 5/00* (2006.01)
*H04W 72/04* (2009.01)
(Continued)

(52) U.S. Cl.
CPC ............ *H04L 5/0007* (2013.01); *H04B 7/0421* (2013.01); *H04B 7/0669* (2013.01);
(Continued)

(58) Field of Classification Search
None
See application file for complete search history.

(56) References Cited

U.S. PATENT DOCUMENTS 4,736,371 A 4/1988 Tejima et al.
4,750,198 A 6/1988 Harper
(Continued)

FOREIGN PATENT DOCUMENTS

AU 2002259221 11/2002
CA 2690245 A1 10/2001
(Continued)

OTHER PUBLICATIONS 3 rd Generation Partnership Project (3GPP); Technical Specification Group (TSG); Radio Access Network (RAN); RF requirements f o r 1.28Mcps UTRA TDD option, 3GPP Standard; 3G TR 25.945, 3rd Generation Partnership Project (3GPP), Mobile Competence Centre; 650, Route Des Lucioles ; F-06921 Sophia-Antipolis Cedex; France, No. V2.0.0, Dec. 20, 2000, pp. 1-144, XP050400193, [retreived on Dec. 20, 2000], p. 126.
(Continued)

*Primary Examiner* — Gregory Sefcheck
(74) *Attorney, Agent, or Firm* — QUALCOMM IP Department; James Hunt Yancey, Jr.

(57) ABSTRACT

Techniques to use OFDM symbols of different sizes to achieve greater efficiency for OFDM systems. The system traffic may be arranged into different categories (e.g., control data, user data, and pilot data). For each category, one or more OFDM symbols of the proper sizes may be selected for use based on the expected payload size for the traffic in that category. For example, control data may be transmitted using OFDM symbols of a first size, user data may be transmitted using OFDM symbols of the first size and a second size, and pilot data may be transmitted using OFDM symbols of a third size or the first size. In one exemplary design, a small OFDM symbol is utilized for pilot and for transport channels used to send control data, and a large OFDM symbol and the small OFDM symbol are utilized for transport channels used to send user data.

12 Claims, 9 Drawing Sheets

(51) Int. Cl.

| | | |
|---|---|---|
| *H04B 7/04* | (2006.01) | |
| *H04B 7/06* | (2006.01) | |
| *H04B 7/08* | (2006.01) | |
| *H04L 1/00* | (2006.01) | |
| *H04L 25/02* | (2006.01) | |
| *H04L 27/26* | (2006.01) | |
| *H04W 28/20* | (2009.01) | |
| *H04W 52/50* | (2009.01) | |

(52) U.S. Cl.
CPC ............ *H04B 7/0697* (2013.01); *H04B 7/0854* (2013.01); *H04L 1/0017* (2013.01); *H04L 5/0028* (2013.01); *H04L 5/0037* (2013.01); *H04L 25/0232* (2013.01); *H04L 25/0248* (2013.01); *H04L 27/2602* (2013.01); *H04W 72/04* (2013.01); *H04B 7/043* (2013.01); *H04L 5/0023* (2013.01); *H04W 28/20* (2013.01); *H04W 52/50* (2013.01)

(56) References Cited

U.S. PATENT DOCUMENTS

| | | | |
|---|---|---|---|
| 4,797,879 A | 1/1989 | Habbab et al. | |
| 5,239,677 A | 8/1993 | Jasinski | |
| 5,241,544 A | 8/1993 | Jasper et al. | |
| 5,295,159 A | 3/1994 | Kerpez | |
| 5,404,355 A | 4/1995 | Raith | |
| 5,422,733 A | 6/1995 | Merchant et al. | |
| 5,471,647 A | 11/1995 | Gerlach et al. | |
| 5,479,447 A | 12/1995 | Chow et al. | |
| 5,491,837 A | 2/1996 | Haartsen | |
| 5,493,712 A | 2/1996 | Ramesh et al. | |
| 5,506,861 A | 4/1996 | Bottomley | |
| 5,509,003 A | 4/1996 | Snijders et al. | |
| 5,528,581 A | 6/1996 | De Bot | |
| 5,606,729 A | 2/1997 | DAmico et al. | |
| 5,638,369 A | 6/1997 | Ayerst et al. | |
| 5,677,909 A | 10/1997 | Heide | |
| 5,710,768 A | 1/1998 | Ziv et al. | |
| 5,729,542 A | 3/1998 | Dupont | |
| 5,790,550 A | 8/1998 | Peeters et al. | |
| 5,799,005 A | 8/1998 | Soliman | |
| 5,818,813 A | 10/1998 | Saito et al. | |
| 5,822,374 A | 10/1998 | Levin | |
| 5,832,387 A | 11/1998 | Bae et al. | |
| 5,859,875 A | 1/1999 | Kato et al. | |
| 5,867,478 A | 2/1999 | Baum et al. | |
| 5,867,539 A | 2/1999 | Koslov | |
| 5,883,887 A | 3/1999 | Take et al. | |
| 5,886,988 A | 3/1999 | Yun et al. | |
| 5,929,810 A | 7/1999 | Koutsoudis et al. | |
| 5,959,965 A | 9/1999 | Ohkubo et al. | |
| 5,963,589 A | 10/1999 | Nagano et al. | |
| 5,973,638 A | 10/1999 | Robbins et al. | |
| 5,982,327 A | 11/1999 | Vook et al. | |
| 6,005,876 A | 12/1999 | Cimini, Jr. et al. | |
| 6,011,963 A | 1/2000 | Ogoro | |
| 6,049,548 A | 4/2000 | Bruno et al. | |
| 6,067,290 A | 5/2000 | Paulraj et al. | |
| 6,072,779 A | 6/2000 | Tzannes et al. | |
| 6,084,915 A | 7/2000 | Williams | |
| 6,097,771 A | 8/2000 | Foschini | |
| 6,115,354 A | 9/2000 | Weck | |
| 6,122,247 A | 9/2000 | Levin et al. | |
| 6,131,016 A | 10/2000 | Greenstein et al. | |
| 6,141,388 A | 10/2000 | Servais et al. | |
| 6,141,542 A | 10/2000 | Kotzin et al. | |
| 6,141,555 A | 10/2000 | Sato | |
| 6,141,567 A | 10/2000 | Youssefmir et al. | |
| 6,144,711 A | 11/2000 | Raleigh et al. | |
| 6,154,661 A | 11/2000 | Goldburg | |
| 6,163,296 A | 12/2000 | Lier et al. | |
| 6,167,031 A | 12/2000 | Olofsson et al. | |
| 6,175,588 B1 | 1/2001 | Visotsky et al. | |
| 6,178,196 B1 | 1/2001 | Naguib et al. | |
| 6,192,256 B1 | 2/2001 | Whinnett | |
| 6,205,410 B1 | 3/2001 | Cai | |
| 6,222,888 B1 | 4/2001 | Kao et al. | |
| 6,232,918 B1 | 5/2001 | Wax et al. | |
| 6,266,528 B1 | 7/2001 | Farzaneh | |
| 6,272,354 B1 | 8/2001 | Saario | |
| 6,275,543 B1 | 8/2001 | Petrus et al. | |
| 6,278,726 B1 | 8/2001 | Mesecher et al. | |
| 6,292,917 B1 | 9/2001 | Sinha et al. | |
| 6,298,035 B1 | 10/2001 | Heiskala | |
| 6,298,092 B1 | 10/2001 | Heath, Jr. et al. | |
| 6,308,080 B1 | 10/2001 | Burt et al. | |
| 6,310,704 B1 | 10/2001 | Dogan et al. | |
| 6,314,113 B1 | 11/2001 | Guemas | |
| 6,314,289 B1 | 11/2001 | Eberlein et al. | |
| 6,317,467 B1 | 11/2001 | Cox et al. | |
| 6,317,612 B1 | 11/2001 | Farsakh | |
| 6,330,277 B1 | 12/2001 | Gelblum et al. | |
| 6,330,293 B1 | 12/2001 | Klank et al. | |
| 6,330,462 B1 | 12/2001 | Chen | |
| 6,333,953 B1 | 12/2001 | Bottomley et al. | |
| 6,339,399 B1 | 1/2002 | Andersson et al. | |
| 6,345,036 B1 | 2/2002 | Sudo et al. | |
| 6,346,910 B1 | 2/2002 | Ito | |
| 6,347,217 B1 | 2/2002 | Bengtsson et al. | |
| 6,347,234 B1 | 2/2002 | Scherzer | |
| 6,348,036 B1 | 2/2002 | Looney et al. | |
| 6,351,499 B1 | 2/2002 | Paulraj et al. | |
| 6,363,267 B1 | 3/2002 | Lindskog et al. | |
| 6,369,758 B1 | 4/2002 | Zhang | |
| 6,377,812 B1 | 4/2002 | Rashid-Farrokhi et al. | |
| 6,385,264 B1 | 5/2002 | Terasawa et al. | |
| 6,389,056 B1 | 5/2002 | Kanterakis et al. | |
| 6,426,971 B1 | 7/2002 | Wu et al. | |
| 6,452,981 B1 | 9/2002 | Raleigh et al. | |
| 6,463,290 B1 | 10/2002 | Stilp et al. | |
| 6,473,467 B1 | 10/2002 | Wallace et al. | |
| 6,478,422 B1 | 11/2002 | Hansen | |
| 6,492,942 B1 | 12/2002 | Kezys | |
| 6,510,184 B1 | 1/2003 | Okamura | |
| 6,512,737 B1 | 1/2003 | Agee | |
| 6,515,617 B1 | 2/2003 | Demers et al. | |
| 6,532,225 B1 | 3/2003 | Chang et al. | |
| 6,532,255 B1 | 3/2003 | Gunzelmann et al. | |
| 6,532,562 B1 | 3/2003 | Chou et al. | |
| 6,545,997 B1 | 4/2003 | Bohnke et al. | |
| 6,574,211 B2 | 6/2003 | Padovani et al. | |
| 6,574,267 B1 | 6/2003 | Kanterakis et al. | |
| 6,574,271 B2 | 6/2003 | Mesecher et al. | |
| 6,590,883 B1 | 7/2003 | Kitade et al. | |
| 6,594,473 B1 | 7/2003 | Dabak et al. | |
| 6,594,798 B1 | 7/2003 | Chou et al. | |
| 6,597,682 B1 | 7/2003 | Kari | |
| 6,608,874 B1 | 8/2003 | Beidas et al. | |
| 6,611,231 B2 | 8/2003 | Crilly et al. | |
| 6,615,024 B1 | 9/2003 | Boros et al. | |
| 6,628,702 B1 | 9/2003 | Rowitch et al. | |
| 6,631,121 B1 | 10/2003 | Yoon | |
| 6,636,496 B1 | 10/2003 | Cho et al. | |
| 6,636,568 B2 | 10/2003 | Kadous | |
| 6,654,590 B2 | 11/2003 | Boros et al. | |
| 6,654,613 B1 | 11/2003 | Maeng et al. | |
| 6,668,161 B2 | 12/2003 | Boros et al. | |
| 6,683,916 B1 | 1/2004 | Sartori et al. | |
| 6,690,660 B2 | 2/2004 | Kim et al. | |
| 6,693,992 B2 | 2/2004 | Jones et al. | |
| 6,694,155 B1 | 2/2004 | Chin et al. | |
| 6,697,346 B1 | 2/2004 | Halton et al. | |
| 6,711,121 B1 | 3/2004 | Gerakoulis et al. | |
| 6,721,267 B2 * | 4/2004 | Hiben et al. ................ 370/206 | |
| 6,728,233 B1 | 4/2004 | Park et al. | |
| 6,731,668 B2 | 5/2004 | Ketchum | |
| 6,735,188 B1 | 5/2004 | Becker et al. | |
| 6,738,020 B1 | 5/2004 | Lindskog et al. | |
| 6,744,811 B1 | 6/2004 | Kantschuk | |
| 6,747,963 B1 | 6/2004 | Park et al. | |
| 6,751,187 B2 | 6/2004 | Walton et al. | |
| 6,751,199 B1 | 6/2004 | Sindhushayana et al. | |

(56) References Cited

U.S. PATENT DOCUMENTS

| | | |
|---|---|---|
| 6,751,444 B1 | 6/2004 | Meiyappan |
| 6,751,480 B2 | 6/2004 | Kogiantis et al. |
| 6,757,263 B1 | 6/2004 | Olds |
| 6,760,313 B1 | 7/2004 | Sindhushayana et al. |
| 6,760,388 B2 | 7/2004 | Ketchum et al. |
| 6,760,882 B1 | 7/2004 | Gesbert et al. |
| 6,763,244 B2 | 7/2004 | Chen et al. |
| 6,768,727 B1 | 7/2004 | Sourour et al. |
| 6,771,706 B2 | 8/2004 | Ling et al. |
| 6,785,341 B2 | 8/2004 | Walton et al. |
| 6,785,513 B1 | 8/2004 | Sivaprakasam |
| 6,788,948 B2 | 9/2004 | Lindskog et al. |
| 6,792,041 B1 | 9/2004 | Kim et al. |
| 6,795,424 B1 * | 9/2004 | Kapoor et al. ................. 370/343 |
| 6,798,738 B1 | 9/2004 | Do et al. |
| 6,801,790 B2 | 10/2004 | Rudrapatna |
| 6,802,035 B2 | 10/2004 | Catreux et al. |
| 6,804,191 B2 | 10/2004 | Richardson |
| 6,821,535 B2 | 11/2004 | Nurmi et al. |
| 6,842,460 B1 | 1/2005 | Olkkonen et al. |
| 6,847,828 B2 | 1/2005 | Miyoshi et al. |
| 6,850,252 B1 | 2/2005 | Hoffberg |
| 6,850,498 B2 | 2/2005 | Heath et al. |
| 6,859,503 B2 | 2/2005 | Pautler et al. |
| 6,862,271 B2 | 3/2005 | Medvedev et al. |
| 6,862,440 B2 | 3/2005 | Sampath |
| 6,868,079 B1 | 3/2005 | Hunt |
| 6,873,651 B2 | 3/2005 | Tesfai et al. |
| 6,879,578 B2 | 4/2005 | Pan et al. |
| 6,879,579 B1 | 4/2005 | Myles et al. |
| 6,882,868 B1 | 4/2005 | Shattil |
| 6,885,708 B2 | 4/2005 | Thomas et al. |
| 6,888,809 B1 | 5/2005 | Foschini et al. |
| 6,888,899 B2 | 5/2005 | Raleigh et al. |
| 6,891,858 B1 | 5/2005 | Mahesh et al. |
| 6,907,270 B1 | 6/2005 | Blanz |
| 6,920,192 B1 | 7/2005 | Laroia et al. |
| 6,920,194 B2 | 7/2005 | Stopler et al. |
| 6,927,728 B2 | 8/2005 | Vook et al. |
| 6,937,592 B1 | 8/2005 | Heath, Jr. et al. |
| 6,940,917 B2 | 9/2005 | Menon et al. |
| 6,950,632 B1 | 9/2005 | Yun et al. |
| 6,952,426 B2 | 10/2005 | Wu et al. |
| 6,952,454 B1 | 10/2005 | Jalali et al. |
| 6,956,813 B2 | 10/2005 | Fukuda |
| 6,956,897 B1 | 10/2005 | Honig |
| 6,956,906 B2 | 10/2005 | Tager et al. |
| 6,959,171 B2 | 10/2005 | Tsien et al. |
| 6,961,388 B2 | 11/2005 | Ling et al. |
| 6,963,741 B2 | 11/2005 | Johansson et al. |
| 6,963,742 B2 | 11/2005 | Boros et al. |
| 6,965,762 B2 | 11/2005 | Sugar et al. |
| 6,970,722 B1 | 11/2005 | Lewis |
| 6,975,868 B2 | 12/2005 | Joshi et al. |
| 6,980,601 B2 | 12/2005 | Jones |
| 6,980,800 B2 | 12/2005 | Noerpel et al. |
| 6,985,434 B2 | 1/2006 | Wu et al. |
| 6,985,534 B1 | 1/2006 | Meister |
| 6,987,819 B2 | 1/2006 | Thomas et al. |
| 6,990,059 B1 | 1/2006 | Anikhindi et al. |
| 6,992,972 B2 | 1/2006 | Van Nee |
| 6,996,380 B2 | 2/2006 | Dent |
| 7,002,900 B2 | 2/2006 | Walton et al. |
| 7,003,044 B2 | 2/2006 | Subramanian et al. |
| 7,006,464 B1 | 2/2006 | Gopalakrishnan et al. |
| 7,006,483 B2 | 2/2006 | Nelson, Jr. et al. |
| 7,006,848 B2 | 2/2006 | Ling et al. |
| 7,009,931 B2 | 3/2006 | Ma et al. |
| 7,012,978 B2 | 3/2006 | Talwar |
| 7,020,110 B2 | 3/2006 | Walton et al. |
| 7,020,482 B2 | 3/2006 | Medvedev et al. |
| 7,020,490 B2 | 3/2006 | Khatri |
| 7,023,826 B2 | 4/2006 | Sjoberg et al. |
| 7,024,163 B1 | 4/2006 | Barratt et al. |
| 7,031,671 B2 | 4/2006 | Mottier |
| 7,035,359 B2 | 4/2006 | Molnar |
| 7,039,125 B2 | 5/2006 | Friedman |
| 7,039,363 B1 | 5/2006 | Kasapi et al. |
| 7,042,858 B1 | 5/2006 | Ma et al. |
| 7,043,259 B1 | 5/2006 | Trott |
| 7,054,378 B2 | 5/2006 | Walton et al. |
| 7,058,367 B1 | 6/2006 | Luo et al. |
| 7,062,294 B1 | 6/2006 | Rogard et al. |
| 7,068,628 B2 | 6/2006 | Li et al. |
| 7,072,381 B2 | 7/2006 | Atarashi et al. |
| 7,072,410 B1 | 7/2006 | Monsen |
| 7,072,413 B2 | 7/2006 | Walton et al. |
| 7,076,263 B2 | 7/2006 | Medvedev et al. |
| 7,088,671 B1 | 8/2006 | Monsen |
| 7,095,709 B2 | 8/2006 | Walton et al. |
| 7,095,722 B1 | 8/2006 | Walke et al. |
| 7,099,377 B2 | 8/2006 | Berens et al. |
| 7,103,325 B1 | 9/2006 | Jia et al. |
| 7,110,378 B2 | 9/2006 | Onggosanusi et al. |
| 7,110,463 B2 | 9/2006 | Wallace et al. |
| 7,113,499 B2 | 9/2006 | Nafie et al. |
| 7,116,652 B2 | 10/2006 | Lozano |
| 7,120,134 B2 | 10/2006 | Tiedemann, Jr. et al. |
| 7,120,199 B2 | 10/2006 | Thielecke et al. |
| 7,120,657 B2 | 10/2006 | Ricks et al. |
| 7,127,009 B2 | 10/2006 | Berthet et al. |
| 7,130,362 B2 | 10/2006 | Girardeau et al. |
| 7,133,459 B2 | 11/2006 | Onggosanusi et al. |
| 7,137,047 B2 | 11/2006 | Mitlin et al. |
| 7,149,190 B1 | 12/2006 | Li et al. |
| 7,149,239 B2 | 12/2006 | Hudson |
| 7,149,254 B2 | 12/2006 | Sampath |
| 7,151,809 B2 | 12/2006 | Ketchum et al. |
| 7,155,171 B2 | 12/2006 | Ebert et al. |
| 7,158,563 B2 | 1/2007 | Ginis et al. |
| 7,164,649 B2 | 1/2007 | Walton et al. |
| 7,164,669 B2 | 1/2007 | Li et al. |
| 7,184,713 B2 | 2/2007 | Kadous et al. |
| 7,187,646 B2 | 3/2007 | Schramm |
| 7,190,749 B2 | 3/2007 | Levin et al. |
| 7,191,381 B2 | 3/2007 | Gesbert et al. |
| 7,194,237 B2 | 3/2007 | Sugar et al. |
| 7,197,084 B2 | 3/2007 | Ketchum et al. |
| 7,200,404 B2 | 4/2007 | Panasik et al. |
| 7,206,354 B2 | 4/2007 | Wallace et al. |
| 7,218,684 B2 | 5/2007 | Bolourchi et al. |
| 7,221,956 B2 | 5/2007 | Medvedev et al. |
| 7,224,704 B2 | 5/2007 | Lu et al. |
| 7,231,184 B2 | 6/2007 | Eilts et al. |
| 7,233,625 B2 | 6/2007 | Ma et al. |
| 7,238,508 B2 | 7/2007 | Lin et al. |
| 7,242,727 B2 | 7/2007 | Liu et al. |
| 7,248,638 B1 | 7/2007 | Banister |
| 7,248,841 B2 | 7/2007 | Agee et al. |
| 7,254,171 B2 | 8/2007 | Hudson |
| 7,260,153 B2 | 8/2007 | Nissani |
| 7,260,366 B2 | 8/2007 | Lee et al. |
| 7,263,119 B1 | 8/2007 | Hsu et al. |
| 7,269,127 B2 * | 9/2007 | Mody et al. ................... 370/210 |
| 7,272,162 B2 * | 9/2007 | Sano et al. ..................... 375/135 |
| 7,274,734 B2 | 9/2007 | Tsatsanis |
| 7,277,679 B1 | 10/2007 | Barratt et al. |
| 7,280,467 B2 | 10/2007 | Smee et al. |
| 7,280,625 B2 | 10/2007 | Ketchum et al. |
| 7,283,508 B2 | 10/2007 | Choi et al. |
| 7,283,581 B2 * | 10/2007 | Itoh ............................. 375/147 |
| 7,289,570 B2 | 10/2007 | Schmidl et al. |
| 7,292,854 B2 | 11/2007 | Das et al. |
| 7,298,778 B2 | 11/2007 | Visoz et al. |
| 7,298,805 B2 | 11/2007 | Walton et al. |
| 7,308,035 B2 | 12/2007 | Rouquette et al. |
| 7,310,304 B2 | 12/2007 | Mody et al. |
| 7,317,750 B2 | 1/2008 | Shattil |
| 7,324,429 B2 | 1/2008 | Walton et al. |
| 7,327,800 B2 | 2/2008 | Oprea et al. |
| 7,333,556 B2 | 2/2008 | Maltsev et al. |
| 7,342,912 B1 | 3/2008 | Kerr et al. |
| 7,356,004 B2 | 4/2008 | Yano et al. |
| 7,356,089 B2 | 4/2008 | Jia et al. |

(56) References Cited

U.S. PATENT DOCUMENTS

| | | |
|---|---|---|
| 7,379,492 B2 | 5/2008 | Hwang |
| 7,386,076 B2 | 6/2008 | Onggosanusi et al. |
| 7,392,014 B2 | 6/2008 | Baker et al. |
| 7,403,748 B1 | 7/2008 | Keskitalo et al. |
| 7,421,039 B2 | 9/2008 | Malaender et al. |
| 7,453,844 B1 | 11/2008 | Lee et al. |
| 7,466,749 B2 | 12/2008 | Medvedev et al. |
| 7,480,278 B2 | 1/2009 | Pedersen et al. |
| 7,486,740 B2 | 2/2009 | Inanoglu |
| 7,492,737 B1 | 2/2009 | Fong et al. |
| 7,508,748 B2 | 3/2009 | Kadous |
| 7,548,506 B2 | 6/2009 | Ma et al. |
| 7,551,546 B2 | 6/2009 | Ma et al. |
| 7,551,580 B2 | 6/2009 | Du Crest et al. |
| 7,573,805 B2 | 8/2009 | Zhuang et al. |
| 7,599,443 B2 | 10/2009 | Ionescu et al. |
| 7,603,141 B2 | 10/2009 | Dravida |
| 7,606,296 B1 | 10/2009 | Hsu et al. |
| 7,606,319 B2 | 10/2009 | Zhang et al. |
| 7,616,698 B2 | 11/2009 | Sun et al. |
| 7,623,871 B2 | 11/2009 | Sheynblat |
| 7,636,573 B2 | 12/2009 | Walton et al. |
| 7,646,747 B2 | 1/2010 | Atarashi et al. |
| 7,653,142 B2 | 1/2010 | Ketchum et al. |
| 7,653,415 B2 | 1/2010 | Van Rooyen |
| 7,656,967 B2 | 2/2010 | Tiirola et al. |
| 7,778,337 B2 * | 8/2010 | Tong et al. ............... 375/260 |
| 7,787,514 B2 * | 8/2010 | Shattil ............... 375/130 |
| 7,822,140 B2 | 10/2010 | Catreux et al. |
| 7,843,972 B2 * | 11/2010 | Nakahara et al. ............... 370/503 |
| 7,885,228 B2 | 2/2011 | Walton et al. |
| 7,986,742 B2 | 7/2011 | Ketchum et al. |
| 8,134,976 B2 | 3/2012 | Wallace et al. |
| 8,145,179 B2 | 3/2012 | Walton et al. |
| 8,169,944 B2 | 5/2012 | Walton et al. |
| 8,170,513 B2 | 5/2012 | Walton et al. |
| 8,194,770 B2 | 6/2012 | Medvedev et al. |
| 8,203,978 B2 | 6/2012 | Walton et al. |
| 8,208,364 B2 | 6/2012 | Walton et al. |
| 8,213,292 B2 * | 7/2012 | Ma et al. ............... 370/208 |
| 8,218,609 B2 | 7/2012 | Walton et al. |
| 8,254,246 B2 | 8/2012 | Ma et al. |
| 8,260,210 B2 | 9/2012 | Esteve et al. |
| 8,320,301 B2 | 11/2012 | Walton et al. |
| 8,325,836 B2 | 12/2012 | Tong et al. |
| 8,355,313 B2 | 1/2013 | Walton et al. |
| 8,358,714 B2 | 1/2013 | Walton et al. |
| 8,406,118 B2 | 3/2013 | Ma et al. |
| 8,462,643 B2 | 6/2013 | Walton et al. |
| 8,483,188 B2 | 7/2013 | Walton et al. |
| 8,570,988 B2 | 10/2013 | Wallace et al. |
| 8,855,226 B2 | 10/2014 | Medvedev et al. |
| 9,013,974 B2 | 4/2015 | Walton et al. |
| 2001/0017881 A1 | 8/2001 | Bhatoolaul et al. |
| 2001/0031621 A1 | 10/2001 | Schmutz |
| 2001/0033623 A1 | 10/2001 | Hosur |
| 2001/0046205 A1 | 11/2001 | Easton et al. |
| 2002/0003774 A1 | 1/2002 | Wang et al. |
| 2002/0004920 A1 | 1/2002 | Cho et al. |
| 2002/0018310 A1 | 2/2002 | Hung |
| 2002/0018453 A1 | 2/2002 | Yu et al. |
| 2002/0027951 A1 | 3/2002 | Gormley et al. |
| 2002/0041632 A1 | 4/2002 | Sato et al. |
| 2002/0044591 A1 | 4/2002 | Lee et al. |
| 2002/0044610 A1 | 4/2002 | Jones |
| 2002/0057659 A1 | 5/2002 | Ozluturk et al. |
| 2002/0062472 A1 | 5/2002 | Medlock et al. |
| 2002/0064214 A1 | 5/2002 | Hattori et al. |
| 2002/0075830 A1 | 6/2002 | Hartman, Jr. |
| 2002/0085620 A1 | 7/2002 | Mesecher |
| 2002/0085641 A1 | 7/2002 | Baum |
| 2002/0098872 A1 | 7/2002 | Judson |
| 2002/0105928 A1 | 8/2002 | Kapoor et al. |
| 2002/0115467 A1 | 8/2002 | Hamabe |
| 2002/0115473 A1 | 8/2002 | Hwang et al. |
| 2002/0122381 A1 | 9/2002 | Wu et al. |
| 2002/0122393 A1 | 9/2002 | Caldwell et al. |
| 2002/0136271 A1 | 9/2002 | Hiramatsu et al. |
| 2002/0147032 A1 | 10/2002 | Yoon et al. |
| 2002/0150182 A1 | 10/2002 | Dogan et al. |
| 2002/0154705 A1 | 10/2002 | Walton et al. |
| 2002/0177447 A1 | 11/2002 | Walton et al. |
| 2002/0183010 A1 | 12/2002 | Catreux et al. |
| 2002/0184453 A1 | 12/2002 | Hughes et al. |
| 2002/0191535 A1 | 12/2002 | Sugiyama et al. |
| 2002/0193146 A1 | 12/2002 | Wallace et al. |
| 2002/0196842 A1 | 12/2002 | Onggosanusi et al. |
| 2003/0002450 A1 | 1/2003 | Jalali et al. |
| 2003/0007463 A1 | 1/2003 | Li et al. |
| 2003/0012308 A1 | 1/2003 | Sampath et al. |
| 2003/0039217 A1 | 2/2003 | Seo et al. |
| 2003/0039317 A1 | 2/2003 | Taylor et al. |
| 2003/0045288 A1 | 3/2003 | Luschi et al. |
| 2003/0045318 A1 | 3/2003 | Subrahmanya |
| 2003/0048856 A1 | 3/2003 | Ketchum et al. |
| 2003/0050069 A1 | 3/2003 | Kogiantis et al. |
| 2003/0072395 A1 | 4/2003 | Jia et al. |
| 2003/0073409 A1 | 4/2003 | Nobukiyo et al. |
| 2003/0076812 A1 | 4/2003 | Benedittis |
| 2003/0078024 A1 | 4/2003 | Magee et al. |
| 2003/0095197 A1 | 5/2003 | Wheeler et al. |
| 2003/0099306 A1 | 5/2003 | Nilsson et al. |
| 2003/0103584 A1 | 6/2003 | Bjerke et al. |
| 2003/0112745 A1 | 6/2003 | Zhuang et al. |
| 2003/0117989 A1 | 6/2003 | Kim |
| 2003/0119452 A1 | 6/2003 | Kim et al. |
| 2003/0123389 A1 | 7/2003 | Russell et al. |
| 2003/0125040 A1 | 7/2003 | Walton et al. |
| 2003/0128656 A1 | 7/2003 | Scarpa |
| 2003/0139194 A1 | 7/2003 | Onggosanusi et al. |
| 2003/0142732 A1 | 7/2003 | Moshavi et al. |
| 2003/0153345 A1 | 8/2003 | Cramer et al. |
| 2003/0153360 A1 | 8/2003 | Burke et al. |
| 2003/0162519 A1 | 8/2003 | Smith et al. |
| 2003/0174676 A1 | 9/2003 | Willenegger et al. |
| 2003/0174686 A1 | 9/2003 | Willenegger et al. |
| 2003/0185311 A1 | 10/2003 | Kim |
| 2003/0186650 A1 | 10/2003 | Liu |
| 2003/0190897 A1 | 10/2003 | Lei et al. |
| 2003/0202492 A1 | 10/2003 | Akella et al. |
| 2003/0202612 A1 | 10/2003 | Halder et al. |
| 2003/0206558 A1 | 11/2003 | Parkkinen et al. |
| 2003/0210668 A1 | 11/2003 | Malladi et al. |
| 2003/0235149 A1 | 12/2003 | Chan et al. |
| 2003/0235255 A1 | 12/2003 | Ketchum et al. |
| 2004/0005887 A1 | 1/2004 | Bahrenburg et al. |
| 2004/0013103 A1 | 1/2004 | Zhang et al. |
| 2004/0017785 A1 | 1/2004 | Zelst |
| 2004/0037257 A1 | 2/2004 | Ngo |
| 2004/0047284 A1 * | 3/2004 | Eidson ............... 370/203 |
| 2004/0052228 A1 | 3/2004 | Tellado et al. |
| 2004/0062192 A1 | 4/2004 | Liu et al. |
| 2004/0071104 A1 | 4/2004 | Boesel et al. |
| 2004/0071107 A1 | 4/2004 | Kats et al. |
| 2004/0076224 A1 | 4/2004 | Onggosanusi et al. |
| 2004/0081131 A1 | 4/2004 | Walton et al. |
| 2004/0121730 A1 | 6/2004 | Kadous et al. |
| 2004/0151108 A1 | 8/2004 | Blasco Claret et al. |
| 2004/0151122 A1 | 8/2004 | Lau et al. |
| 2004/0160921 A1 | 8/2004 | Kaipainen et al. |
| 2004/0160987 A1 | 8/2004 | Sudo et al. |
| 2004/0176097 A1 | 9/2004 | Wilson et al. |
| 2004/0198276 A1 | 10/2004 | Tellado et al. |
| 2004/0252632 A1 | 12/2004 | Bourdoux et al. |
| 2005/0002326 A1 | 1/2005 | Ling et al. |
| 2005/0047384 A1 | 3/2005 | Wax et al. |
| 2005/0047515 A1 | 3/2005 | Walton et al. |
| 2005/0099974 A1 | 5/2005 | Kats et al. |
| 2005/0120097 A1 | 6/2005 | Walton et al. |
| 2005/0128953 A1 | 6/2005 | Wallace et al. |
| 2005/0135284 A1 | 6/2005 | Nanda et al. |
| 2005/0135295 A1 | 6/2005 | Walton et al. |
| 2005/0135308 A1 | 6/2005 | Vijayan et al. |
| 2005/0135318 A1 | 6/2005 | Walton et al. |

(56) References Cited

U.S. PATENT DOCUMENTS

| | | | |
|---|---|---|---|
| 2005/0147177 A1 | 7/2005 | Seo et al. |
| 2005/0174981 A1 | 8/2005 | Heath et al. |
| 2005/0185575 A1 | 8/2005 | Hansen et al. |
| 2005/0195915 A1 | 9/2005 | Raleigh et al. |
| 2005/0208959 A1 | 9/2005 | Chen et al. |
| 2005/0220211 A1 | 10/2005 | Shim et al. |
| 2005/0245264 A1 | 11/2005 | Laroia et al. |
| 2005/0276343 A1 | 12/2005 | Jones |
| 2006/0018247 A1 | 1/2006 | Driesen et al. |
| 2006/0018395 A1 | 1/2006 | Tzannes |
| 2006/0039275 A1 | 2/2006 | Walton et al. |
| 2006/0067417 A1 | 3/2006 | Park et al. |
| 2006/0072649 A1 | 4/2006 | Chang et al. |
| 2006/0077935 A1 | 4/2006 | Hamalainen et al. |
| 2006/0104196 A1 | 5/2006 | Wu et al. |
| 2006/0104340 A1 | 5/2006 | Walton et al. |
| 2006/0114858 A1 | 6/2006 | Walton et al. |
| 2006/0153237 A1 | 7/2006 | Hwang et al. |
| 2006/0159120 A1 | 7/2006 | Kim |
| 2006/0176968 A1 | 8/2006 | Keaney et al. |
| 2006/0183497 A1 | 8/2006 | Paranchych et al. |
| 2006/0209894 A1 | 9/2006 | Tzannes et al. |
| 2006/0209937 A1 | 9/2006 | Tanaka et al. |
| 2007/0177681 A1 | 8/2007 | Choi et al. |
| 2007/0274278 A1 | 11/2007 | Choi et al. |
| 2008/0267138 A1 | 10/2008 | Walton et al. |
| 2008/0285488 A1 | 11/2008 | Walton et al. |
| 2008/0285669 A1 | 11/2008 | Walton et al. |
| 2009/0129454 A1 | 5/2009 | Medvedev et al. |
| 2009/0161613 A1 | 6/2009 | Kent et al. |
| 2009/0291642 A1 | 11/2009 | Cozzo et al. |
| 2010/0067401 A1 | 3/2010 | Medvedev et al. |
| 2010/0119001 A1 | 5/2010 | Walton et al. |
| 2010/0142636 A1 | 6/2010 | Heath, Jr. et al. |
| 2010/0183088 A1 | 7/2010 | Inanoglu |
| 2010/0208841 A1 | 8/2010 | Walton et al. |
| 2010/0220825 A1 | 9/2010 | Dubuc et al. |
| 2010/0260060 A1 | 10/2010 | Abraham et al. |
| 2010/0271930 A1 | 10/2010 | Tong et al. |
| 2011/0096751 A1 | 4/2011 | Ma et al. |
| 2011/0235744 A1 | 9/2011 | Ketchum et al. |
| 2012/0134435 A1* | 5/2012 | Kapoor et al. ................. 375/267 |
| 2012/0140664 A1 | 6/2012 | Walton et al. |
| 2012/0176928 A1 | 7/2012 | Wallace et al. |
| 2012/0219093 A1 | 8/2012 | Jia et al. |
| 2013/0040682 A1 | 2/2013 | Chang et al. |
| 2013/0235825 A1 | 9/2013 | Walton et al. |
| 2014/0036823 A1 | 2/2014 | Ma et al. |

FOREIGN PATENT DOCUMENTS

| | | |
|---|---|---|
| CA | 2690247 | 10/2001 |
| CN | 1086061 | 4/1994 |
| CN | 1234661 | 11/1999 |
| CN | 1298266 A | 6/2001 |
| CN | 1308794 A | 8/2001 |
| CN | 1314037 A | 9/2001 |
| CN | 1325198 | 12/2001 |
| CN | 1325243 A | 12/2001 |
| CN | 1339885 A | 3/2002 |
| CN | 1347609 A | 5/2002 |
| CN | 1469662 | 1/2004 |
| CN | 1489836 A | 4/2004 |
| CN | 1537371 | 10/2004 |
| DE | 19951525 A1 | 6/2001 |
| EP | 0755090 A1 | 1/1997 |
| EP | 0762701 | 3/1997 |
| EP | 0772329 | 5/1997 |
| EP | 0805568 A1 | 11/1997 |
| EP | 0869647 A2 | 10/1998 |
| EP | 0895387 A1 | 2/1999 |
| EP | 0929172 A1 | 7/1999 |
| EP | 0951091 A2 | 10/1999 |
| EP | 0991221 A2 | 4/2000 |
| EP | 0993211 | 4/2000 |
| EP | 1061446 | 12/2000 |
| EP | 1075093 | 2/2001 |
| EP | 1087545 A1 | 3/2001 |
| EP | 1117197 A2 | 7/2001 |
| EP | 1126673 A2 | 8/2001 |
| EP | 1133070 | 9/2001 |
| EP | 1137217 | 9/2001 |
| EP | 1143754 A1 | 10/2001 |
| EP | 1170879 A1 | 1/2002 |
| EP | 1175022 A2 | 1/2002 |
| EP | 1182799 A2 | 2/2002 |
| EP | 1185001 A2 | 3/2002 |
| EP | 1185015 | 3/2002 |
| EP | 1185048 A2 | 3/2002 |
| EP | 1207635 A1 | 5/2002 |
| EP | 1207645 A1 | 5/2002 |
| EP | 1223702 A1 | 7/2002 |
| EP | 1241824 | 9/2002 |
| EP | 1265411 | 12/2002 |
| EP | 1315311 A1 | 5/2003 |
| EP | 1379020 | 1/2004 |
| EP | 1387545 | 2/2004 |
| EP | 1416688 A1 | 5/2004 |
| EP | 1447934 A1 | 8/2004 |
| EP | 1556984 A2 | 7/2005 |
| GB | 2300337 | 10/1996 |
| GB | 2373973 A | 10/2002 |
| JP | 1132027 | 5/1989 |
| JP | 03104430 | 5/1991 |
| JP | 06003956 | 1/1994 |
| JP | 6501139 T | 1/1994 |
| JP | 8274756 A | 10/1996 |
| JP | 9135230 | 5/1997 |
| JP | 9266466 | 10/1997 |
| JP | 9307526 A | 11/1997 |
| JP | 09327073 | 12/1997 |
| JP | 9512156 | 12/1997 |
| JP | 10028077 | 1/1998 |
| JP | 10051402 A | 2/1998 |
| JP | 10084324 | 3/1998 |
| JP | 10209956 A | 8/1998 |
| JP | 10303794 A | 11/1998 |
| JP | 10327126 | 12/1998 |
| JP | 1141159 | 2/1999 |
| JP | 11074863 A | 3/1999 |
| JP | 11163823 A | 6/1999 |
| JP | 11205273 | 7/1999 |
| JP | 11252037 A | 9/1999 |
| JP | 11317723 A | 11/1999 |
| JP | 2991167 | 12/1999 |
| JP | 2000068975 A | 3/2000 |
| JP | 2000078105 | 3/2000 |
| JP | 2000092009 A | 3/2000 |
| JP | 2001044930 A | 2/2001 |
| JP | 200186045 | 3/2001 |
| JP | 2001103034 A | 4/2001 |
| JP | 2001186051 A | 7/2001 |
| JP | 2001510668 A | 7/2001 |
| JP | 2001217896 | 8/2001 |
| JP | 2001231074 | 8/2001 |
| JP | 2001237751 A | 8/2001 |
| JP | 200264879 | 2/2002 |
| JP | 2002504283 | 2/2002 |
| JP | 200277098 | 3/2002 |
| JP | 200277104 | 3/2002 |
| JP | 2002111627 | 4/2002 |
| JP | 2002118534 A | 4/2002 |
| JP | 2002510932 A | 4/2002 |
| JP | 2002514033 A | 5/2002 |
| JP | 2002164814 | 6/2002 |
| JP | 2002176379 A | 6/2002 |
| JP | 2002204217 | 7/2002 |
| JP | 2002232943 A | 8/2002 |
| JP | 2003504941 | 2/2003 |
| JP | 2003198442 A | 7/2003 |
| JP | 2003530010 | 10/2003 |
| JP | 2004266586 | 9/2004 |
| JP | 2004297172 | 10/2004 |

(56) References Cited

FOREIGN PATENT DOCUMENTS

| | | |
|---|---|---|
| JP | 2004535694 | 11/2004 |
| JP | 2005519520 | 6/2005 |
| JP | 2006504336 A | 2/2006 |
| JP | 2006504372 | 2/2006 |
| JP | 4860925 | 11/2011 |
| KR | 200011799 | 2/2000 |
| KR | 20010098861 | 11/2001 |
| KR | 1020020003370 | 1/2002 |
| KR | 20030085040 | 11/2003 |
| KR | 20060095576 A | 8/2006 |
| RU | 2015281 C1 | 6/1994 |
| RU | 2111619 C1 | 5/1998 |
| RU | 2134489 | 8/1999 |
| RU | 2139633 | 10/1999 |
| RU | 2141168 C1 | 11/1999 |
| RU | 2146418 C1 | 3/2000 |
| RU | 2149509 | 5/2000 |
| RU | 2152132 | 6/2000 |
| RU | 2157592 | 10/2000 |
| RU | 2158479 C2 | 10/2000 |
| RU | 2168277 | 5/2001 |
| RU | 2168278 C2 | 5/2001 |
| RU | 2197781 C2 | 1/2003 |
| RU | 2201034 C2 | 3/2003 |
| RU | 2335852 C2 | 10/2008 |
| TW | 419912 | 1/2001 |
| TW | 496620 | 7/2002 |
| TW | 503347 | 9/2002 |
| TW | 200300636 | 6/2003 |
| TW | 545006 B | 8/2003 |
| TW | 567689 | 12/2003 |
| TW | 567701 | 12/2003 |
| TW | 583842 B | 4/2004 |
| TW | I230525 | 4/2005 |
| TW | I263449 | 10/2006 |
| TW | I267251 B | 11/2006 |
| WO | 8607223 | 12/1986 |
| WO | 9210890 A1 | 6/1992 |
| WO | 9307684 A1 | 4/1993 |
| WO | 9507578 | 3/1995 |
| WO | WO-9516319 A1 | 6/1995 |
| WO | 9521501 A1 | 8/1995 |
| WO | 9530316 A1 | 11/1995 |
| WO | 9532567 A1 | 11/1995 |
| WO | 9622662 | 7/1996 |
| WO | 9635268 | 11/1996 |
| WO | 9702667 | 1/1997 |
| WO | 9719525 A1 | 5/1997 |
| WO | 9736377 A1 | 10/1997 |
| WO | 9809381 A1 | 3/1998 |
| WO | 9809395 | 3/1998 |
| WO | 9824192 A1 | 6/1998 |
| WO | 9826523 | 6/1998 |
| WO | 9830470 A1 | 7/1998 |
| WO | 9857472 | 12/1998 |
| WO | 9903224 | 1/1999 |
| WO | 9914878 | 3/1999 |
| WO | 9916214 | 4/1999 |
| WO | 9929049 A2 | 6/1999 |
| WO | 9944379 A1 | 9/1999 |
| WO | 9952224 A1 | 10/1999 |
| WO | 9957820 | 11/1999 |
| WO | 0011823 A1 | 3/2000 |
| WO | 0036764 A2 | 6/2000 |
| WO | 0062456 A1 | 10/2000 |
| WO | 0105067 A1 | 1/2001 |
| WO | 0126269 A1 | 4/2001 |
| WO | 0163775 A2 | 8/2001 |
| WO | 0169801 | 9/2001 |
| WO | 0171928 A2 | 9/2001 |
| WO | 0176110 A2 | 10/2001 |
| WO | 0180510 A1 | 10/2001 |
| WO | 0182521 A2 | 11/2001 |
| WO | 0195531 A2 | 12/2001 |
| WO | 0197400 | 12/2001 |
| WO | 0201732 A2 | 1/2002 |
| WO | 0203557 A1 | 1/2002 |
| WO | WO-0205506 A2 | 1/2002 |
| WO | 0215433 A1 | 2/2002 |
| WO | 0225853 A2 | 3/2002 |
| WO | 02060138 | 8/2002 |
| WO | 02062002 A1 | 8/2002 |
| WO | 02065664 A2 | 8/2002 |
| WO | 02069523 A1 | 9/2002 |
| WO | 02069590 A1 | 9/2002 |
| WO | 02073869 A1 | 9/2002 |
| WO | 02075955 A1 | 9/2002 |
| WO | 02078211 A2 | 10/2002 |
| WO | 02082689 A2 | 10/2002 |
| WO | 02088656 | 11/2002 |
| WO | 02093784 A1 | 11/2002 |
| WO | 02099992 | 12/2002 |
| WO | 03010984 A1 | 2/2003 |
| WO | 03010994 A1 | 2/2003 |
| WO | 03019984 A1 | 3/2003 |
| WO | 03028153 | 4/2003 |
| WO | 03034646 A2 | 4/2003 |
| WO | 03047140 A1 | 6/2003 |
| WO | 03075479 A1 | 9/2003 |
| WO | 04002011 | 12/2003 |
| WO | 04002047 | 12/2003 |
| WO | 2004038985 A2 | 5/2004 |
| WO | 2004038986 A2 | 5/2004 |
| WO | 2004039011 | 5/2004 |
| WO | 2004039022 | 5/2004 |
| WO | 2005041515 | 5/2005 |
| WO | 2005043855 | 5/2005 |
| WO | 2005046113 A2 | 5/2005 |

OTHER PUBLICATIONS

3GPP2 TIA/EIA/IS-2000.2-A, "Physical Layer Standard for cdma2000: Standards for Spread Spectrum Systems," (Mar. 2000), Telecommunications Industry Association, pp. 1-446.

3rd Generation Partnership Project ; Technical Specification Group Radio Access Network; Radio Resource Control (RRC); Protocol Specifiation (Release 5 ), 3GPP Standard; 3GPP TS 25.331, 3rd Generation Partnership Project (3GPP), Mobile Competence Centre ; 650, Route Des Lucioles ; F-06921 Sophia-Antipolis Cedex; France, No. V5.2.0, Sep. 1, 2002, pp. 1-938, XP050367950, pp. 124, 358-p. 370.

"3rd Generation Partnership Project ; Technical Specification Group Radio Access 6-18, Network; Physical channels and mapping of 21-24 transport channels onto physical channels (TDD) (Release 5 )" , 3GPP Standard; 3GPP TS 25.221, 3rd Generation Partnership Project (3GPP), Mobile Competence Centre ; 650, Route Des Lucioles ; F-06921 Sophia-Antipolis Cedex ; France, No. V5.2.0, Sep. 1, 2002, pp. 1-97, XP050366967.

Alamouti, S.M., "A Simple Transmit Diversity Technique for Wireless Communications," IEEE Journal on Select Areas in Communications, vol. 16, No. 8, Oct. 1998, pp. 1451-1458.

Bingham J.A.C., "Multicarrier modulation for data transmission: An idea whose time has come," Communications Magazine, , IEEE, vol. 28, Issue 5, pp. 5-14 (May 1990).

Catreux S., et al., "Simulation results for an interference-limited multiple input multiple output cellular system"., Global Telecommmunications letters . IEEE: U.S.A. Nov. 2000. vol. 4(11), pp. 334-336.

Chen, K.C. et al., "Novel Space-Time Processing of DS/CDMA Multipath Signal," IEEE 49th, Vehicular Technology Conference, Houston, Texas, May 16-20, 1999, pp. 1809-1813.

Choi, R. et al., "MIMO Transmit Optimization for Wireless Communication Systems," Proceedings of the First IEEE International workshops on Electronic Design, pp. 1-6, Piscataway, New Jersey, Jan. 29-31, 2002.

Chung, J. et al: "Multiple antenna systems for 802.16 systems." IEEE 802.16 Broadband Wireless Access Working Group <http://ieee802.org/I6>, IEEE 802.16abc-01/31, Sep. 7, 2001, pp. 1-5.

(56) References Cited

OTHER PUBLICATIONS

Coleri, S. et al: "Channel Estimation Techniques Based on Pilot Arrangement in OFDM Systems," IEEE Transactions on Broadcasting, Sep. 1, 2002, pp. 223-229, vol. 48, No. 3, IEEE Service Center, XP011070267, ISSN: 0018-9316.
Co-pending U.S. Appl. No. 07/624,118, filed Dec. 7, 1990.
Co-pending U.S. Appl. No. 08/118,473, filed Sep. 8, 1993.
Co-pending U.S. Appl. No. 60/421,309, filed Oct. 25, 2002.
Co-pending U.S. Appl. No. 60/421,428, filed Oct. 25, 2002.
Deneire, Luc, et al.: "A Low Complexity ML Channel Estimator for OFDM," Proc IEEE ICC (Jun. 2001), pp. 1461-1465.
Diggavi, S. et al., "Intercarrier interference in MIMO OFDM," IEEE International Conference on Communications, (Aug. 2002), vol. 1, pp. 485-489, doi: 10.1109/ICC.2002.996901.
Editor: 3GPP Draft; 3rd Generation Partnership Project (3GPP), Technical Specification Group (TSG) Radio Access Network (RAN); Working Group 4(WG4); base Station conformance and testing, TS 25.141 V0.1.1 (May 1999), R4-99349, Mobile Competence Centre; 650, Route Des Lucioles; F-06921 Sophia-Antipolis Cedex; France, vol. RAN WG4, no.Miami; Oct. 24, 2001, XP050166323.
EPO Communication pursuant to Article 94(3) EPC issued by the European Patent Orifice for Application No. 10174926.5 dated Aug. 1, 2013 (for counterpart docket No. 020554EPD3D1).
EPO Communication pursuant to Article 94(3) EPC issued by the European Patent Orifice for Application No. 10174932.3 dated Jul. 30, 2013 (for counterpart docket No. 020554EPD3D2).
ETSI TS 101 761-1 v1.3.1, "Broadband Radio Access Networks (BRAN); HIPERLAN Type 2; Data Link Control (DLC) Layer; Part 1: Basic Data Transport Functions," ETSI Standards, European Telecommunications Standards Institute BR (V131), pp. 1-88 (Dec. 2001).
European Search Report—EP11173875—Search Authority—Hague—Oct. 25, 2011.
Fujii, M.: "Pseudo-Orthogonal Multibeam-Time Transmit Diversity for OFDM-CDMA" pp. 222-226 (2002).
G. Bauch, J. Hagenauer, "Smart Versus Dumb Antennas—Capacities and FEC Performance," IEEE Communications Letters, vol. 6, No. 2, pp. 55-57, Feb. 2002.
Gao, J. et al. "On implementation of Bit-Loading Algorithms for OFDM Systems with Multiple-Input Multiple Output," VTC 2002-Fall. 2002 IEEE 56th. Vehicular Technology Conference Proceedings. Vancouver, Canada, (Sep. 24-28, 2002), IEEE Vehicular Technology Conference, pp. 199-203.
Gore, D. A., et al.: "Selecting an optimal set of transmit antennas for a low rank matrix channel," 2000 IEEE International Conference on Acoustics, Speech, and Signal Processing. Proceedings. (ICASSP). Istanbul, Turkey, Jun. 5-9, 2000, New York, NY; IEEE, US, vol. 5 of 6, (Jun. 5, 2000), pp. 2785-2788, XP001035763, abstract.
Grunheid, R. et al., "Adaptive Modulation and Multiple Access for the OFDM Transmission Technique," Wireless Personal Communications 13: May 13, 2000, 2000 Kluwer Academic Publishers, pp. 4-13, XP000894156.
Harada H., et al., "An OFDM-Based Wireless ATM Transmission System Assisted by a Cyclically ExtendedPN Sequence for Future Broad-BandMobile Multimedia Communications", IEEE Transactions on Vehicular Technology, IEEE Service Center, Piscataway, NJ, US, vol. 50, No. 6, Nov. 1, 2001, XP011064321, ISSN: 0018-9545.
Hassibi, B. et al., "High Rate Codes That Are Linear in Space and Time," Lucent Technologies, 2002, pp. 1-55.
Haustein, T. et al.: "Performance of MIMO Systems with Channel Inversion," IEEE 55th Vehicular Technology Conference, Birmingham, Alabama, May 6-9, 2002, pp. 35-39.
Hayashi, K. et al.: "A New Spatio-Temporal Equalization Method Based on Estimated Channel Response," Sep. 2001, IEEE Transactions on Vehicular Technology, vol. 50, No. 5, pp. 1250-1259.
Heath et al., "Multiuser diversity for MIMO wireless systems with linear receivers", Conference Record of the 35th Asilomar Conference on Signals, Systems, & Computers, Nov. 4, 2001, pp. 1194-1199, vol. 2, IEEE, XP010582229, DOI: 10.1109/ACSSC.2001.987680, ISBN: 978-0-7803-7147-7.

Hong, D. K. et al.: "Robust Frequency Offset Estimation for Pilot Symbol Assisted Packet CDMA with MIMO Antenna Systems," IEEE Communications Letters, vol. 6, No. 6, pp. 262-264, XP-001133262 (Jun. 2002).
IEEE Std 802.11a-1999 (Supplement to IEEE Std 801.11-1999) "Part 11: Wireless LAN Medium Access Control (MAC) and Physical Layer (PHY) specifications: High-Speed physical Layer in the 5GHZ Band", pp. 1-90, Sep. 1999.
International Search Report PCT Application No. PCT-US03-033907, International Search Authority, European Patent Office, filed on Aug. 23, 2004.
Iserte, P., et al., "Joint beamforming strategies in OFDM-MIMO systems," Acoustics, Speech, and Signal Processing, 1993. ICASSP-93., 1993 IEEE International Conference on , vol. 3, sections 2-3, Apr. 27-30, 1993, doi: 10.1109/ICASSP.2002.1005279.
Joham, M. et al.: "Symbol Rate Processing for the Downlink of DS-CDMA Systems", IEEE Journal on Selected Areas in Communications, vol. 19, No. 1, paragraphs 1, 2; IEEE Service Center, Piscataway, US, (Jan. 1, 2001), XP011055296, ISSN: 0733-8716.
Jongren, G. et al.: "Utilizing Quantized Feedback Information in Orthogonal Space-Time Block Coding," 2000 IEEE Global Telecommunications Conference, 2(4): 995-999, Nov. 27, 2000.
Kiessling, M. et al., "Short-term and long-term diagonalization of correlated MIMO channels with adaptive modulation" IEEE International Symposium on Personal, Indoor and Mobile Radio Communications, vol. 2, Sep. 15, 2002, pp. 593-597.
Kousa M, et al., "Multichannel adaptive forward error-correction system", IEEE Proceedings I. Solid-State & Electron Devices, Institution of Electrical Engineers. Stevenage, GB, vol. 140, No. 5, Part 1, Oct. 1, 1993, pp. 357-364, XP000403498, ISSN: 0956-3776.
Lal D et al: "A novel MAC layer protocol for space division multiple access in wireless ad hoc networks", Computer Communications and Networks, 2002 Proceedings, Eleventh International Conference on Oct. 14, 2002, pp. 614-619.
Le Goff, S. et al: "Turbo-codes and high spectral efficiency modulation," IEEE International Conference on Communications, 1994. ICC "94, SUPERCOMM/ICC "94, Conference Record, 'Serving Humanity Through Communications.' pp. 645-649, vol. 2, May 1-5, 1994, XP010126658, doi: 10.1109/ICC.1994.368804.
Lebrun G., et al., "MIMO transmission over a time varying TDD channel using SVD," Electronics Letters, 2001, vol. 37, pp. 1363-1364.
Li, Lihua, et al., "A practical space-frequency block coded OFDM scheme for fast fading broadband channels," 2002. The 13th IEEE International Symposium on Personal, Indoor and Mobile Radio communications, vol. 1, Sep. 15-18, 2002.pp. 212-216 vol. 1.
Li, Ye et. al., "Simplified Channel Estimation for OFDM Systems with Multiple Transmit Antennas," IEEE Transactions on Wireless Communications, Jan. 2002, vol. 1, No. 1, pp. 67-75.
Louvigne J.C., et al., "Experimental study of a real-time calibration procedure of a CDMA/TDD multiple antenna terminal," IEEE Antennas and Propagation Society International Symposium, 2002 Digest.APS.San Antonio, TX, Jun. 16-21, 2002,vol. 2, Jun. 16, 2002, pp. 644-647, XP010591780, DOI: 10.1109/APS.2002.1016729, ISBN: 978-0-7803-7330-3.
Miyashita, K. et al: "High data-rate transmission with eigenbeam-space division multiplexing (E-SDM) in a MIMO channel," VTC 2002-Fall. 2002 IEEE 56th. Vehicular Technology Conference Proceedings. Vancouver, Canada, Sep. 24-28, 2002, IEEE Vehicular Technology Conference, New York, NY: IEEE, US, vol. vol. 1 of 4. Conf. 56, (Sep. 24, 2002), pp. 1302-1306, XP010608639.
Nogueroles R., et al., "Performance of a random OFDMA system for mobile communications", Broadband Communications, 1998. Accessing, Transmission, Networking. Proceedings. 1998 International Zurich Seminar on Zurich, Switzerland Feb. 17-19, 1998, New York, NY, USA, IEEE, US, Feb. 17, 1998, pp. 37-43, XP010277032, DOI : 10.1109/IZSBC.1998.670242 ISBN: 978-0-7803-3893-7, p. 1-p. 2.
Partial European Search Report —EP11173875—Search Authority—Hague—Aug. 18, 2011.

(56) References Cited

OTHER PUBLICATIONS

Pautler, J. et al.: "On Application of Multiple-Input Multiple-Output Antennas to CDMA Cellular Systems," IEEE 54th Vehicular Technology Conference Proceedings, Atlantic City, New Jersey, Oct. 7-11, 2001, pp. 1508-1512.

Sakaguchi et al, "Comprehensive Calibration for MIMO System", International Symposium on Wireless Personal Multimedia Communications, IEEE, vol. 2, Oct. 27, 2002, pp. 440-443.

Sampath et al., "A Fourth-Generation MIMO-OFDM Broadband Wireless System: Design, Performance and Field Trial Results", IEEE Communications Magazine, Sep. 1, 2002, pp. 143-149, vol. 40, No. 9, IEEE Service Center, XP011092922, ISSN: 0163-6804, DOI: 10.1109/MCOM.2002.1031841.

Sampath, H., et al., "Joint transmit and receive optimization for high data rate wireless communication using multiple antennas," Signals, Systems, and Computers, 1999. Conference Record of the Thirty-Third Asilomar Conference, Oct. 24, 1999, XP010373976, pp. 215-219, IEEE, Piscataway, NJ, US.

Song, Bong-Gee et al., "Prefilter design using the singular value decomposition for MIMO equalization," 1996 Conference Record of the Thirtieth Asilomar Conference on Signals, Systems and Computers, vol. 1, pp. 34-38, Nov. 3-6, 1996, XP010231388, DOI : 10.1109/ACSSC.1996.600812, p. 35, col. 2, paragraph 4 through p. 36, col. 1.

Taiwanese Search Report for Application No. 092129820 TIPO filed on Apr. 16, 2014.

Tarighat, a. et al. "Performance Analysis of Different Algorithms for cdma2000 Antenna Array System and a New Multi User Beamforming (MUB) Algorithm", Wireless Communications and Networking Conference, vol. 1, pp. 409-414, Sep. 23, 2000.

Technical Search Report issued by the Taiwan Patent Office for TW Application No. 098143050, dated Aug. 2, 2013.

The Authoritative Dictionary of IEEE Standards Terms, Seventh Edition, IEEE Press: New York (Dec. 2000), p. 902.

Theon, S. et al.: "Improved Adaptive Downlink for OFDM/SDMA-Based Wireless Networks," IEEE VTS 53rd Vehicular Technology Conference, pp. 707-711, Rhodes, Greece, May 6-9, 2001.

Tujkovic, D.: "High bandwidth efficiency space-time turbo coded modulation", Institute of Electrical and Electronics Engineers, ICC 2001. 2001 IEEE International Conference on Communications, Conference Record, pp. 1104-1109, Helsinki, Finland, Jun. 11-14, 2001.

Van Zelst, A. et al.: "Space Division Multiplexing (SDM) for OFDM Systems," IEEE 51st Vehicular Technology Conference Proceedings, pp. 1070-1074, Tokyo, Japan, May 15-18, 2000.

Varanasi M.K, et al., "Optimum decision feedback multiuser equalization with successive decoding achieves the total capacity of the Gaussian multiple-access channel", Signals, Systems & Computers, 1997. Conference Record of the Thirty-First Asilomar Conference on Pacific Grove, CA, USA Nov. 2-5, 1997, Los Alamitos, CA, USA,IEEE Comput. Soc, US, vol. 2, Nov. 2, 1997, pp. 1405-1409 , XP010280667, DOI: 10.1109/ACSSC.1997 . 679134 ISBN : 978-0-8186-8316-9 * pp. 1,3,5; figures 1,3 *.

Vook, F. W. et al., "Adaptive antennas for OFDM", Vehicular Technology Conference, vol. 1, May 18-21, 1998, pp. 606-610, XP010287858, New York, NY, USA, IEEE, US DOI: 10.1109/VETEC.1998.686646 ISBN: 978-0-7803-4320-7.

Wales, S.W. "A mimo technique within the UTRA TDD standard," MIMO: Communications Systems from Concept to Implementations (Ref. No. 2001/175), IEE Seminar on, (Dec. 12, 2001), pp. 1-8., London, UK.

Warner, W. et al.: "OFDM/FM Frame Synchronization for Mobile Radio Data Communication", IEEE Transactions on Vehicular Technology, Aug. 1993, vol. 42, No. 3, pp. 302-313.

Wolniansky P.W., et al., "V-BLAST: An architecture for realizing very high data rates over the rich-scattering wireless channel," Signals, Systems, and Electronics, 1998. ISSE 98. 1998 URSI International Symposium, pp. 295-300, (Sep. 29-Oct. 2, 1998), doi: 10.1109/ISSSE.1998.738086.

Wong, et al., "Multiuser OFDM With Adaptive Subcarrier, Bit, and Power Allocation," Oct. 1999, IEEE Journal on Selected Areas in Communications, vol. 17, No. 10, pp. 1747-1758.

Wong K. K., et al., "Optimizing time and space MIMO antenna system for frequency selective fading channels," IEEE Journal on Selected Areas in Communications, vol. 19, No. 7, Jul. 2001, Sections II and III and V, 1396, pp. 1395-1407.

Wyglinski, Alexander. "Physical Layer Loading Algorithms for Indoor Wireless Multicarrier Systems," Thesis Paper, McGill University, Montreal, Canada, Nov. 2004, p. 109.

Yamamura, T et al., "High Mobility OFDM transmission system by a new channel estimation and ISI cancellation scheme using characteristics of pilot symbol inserted OFDM signal"., Vehicular Technology Conference, vol. 1, Sep. 19, 1999-Sep. 22, 1999, pp. 319323, XP010352958 IEEE, Piscataway, NJ, USA, ISBN: 0-7803-5435-4.

Yoshiki, T., et al., "A Study on Subcarrier Adaptive Demodulation System using Multilevel Transmission Power Control for OFDM/FDD System," The Institute of Electronics, Information and Communications Engineers general meeting, lecture collection, Japan, Mar. 7, 2000, Communication 1, p. 400.

\* cited by examiner

FIG. 2

OFDM Symbol Size = N: Cyclic Prefix | Transformed Symbol | Cyclic Prefix | Transformed Symbol | Cyclic Prefix | Transformed Symbol | Cyclic Prefix | Transformed Symbol OFDM Symbol Size = 2N: Cyclic Prefix | Transformed Symbol | Cyclic Prefix | Transformed Symbol OFDM Symbol Size = 4N: Cyclic Prefix | Transformed Symbol

OFDM COMMUNICATION SYSTEM WITH MULTIPLE OFDM SYMBOL SIZES

This application is a continuation of U.S. application Ser. No. 10/375,162, entitled "OFDM Communication System with Multiple OFDM Symbol Sizes," filed Feb. 24, 2004, now abandoned, which claims the benefit of provisional U.S. Application Ser. No. 60/421,309, entitled "MIMO WLAN System," filed on Oct. 25, 2002, and provisional U.S. Application Ser. No. 60/438,601, entitled "Pilot Transmission Schemes for Wireless Multi-Carrier Communication Systems," filed on Jan. 7, 2003, all of which are assigned to the assignee of the present application and incorporated herein by reference in their entirety for all purposes.

BACKGROUND

I. Field

The present invention relates generally to data communication, and more specifically to orthogonal frequency division multiplexing (OFDM) communication systems and techniques for providing OFDM symbol sizes to increase wireless efficiency.

II. Background

Wireless communication systems are widely deployed to provide various types of communication services such as voice, packet data, and so on. These systems may utilize OFDM, which is a modulation technique capable of providing high performance for some wireless environments. OFDM effectively partitions the overall system bandwidth into a number of ($N_S$) orthogonal subbands, which are also commonly referred to as tones, bins, and frequency subchannels. With OFDM, each subband is associated with a respective carrier that may be modulated with data.

In OFDM, a stream of information bits is converted to a series of frequency-domain modulation symbols. One modulation symbol may be transmitted on each of the $N_S$ subbands in each OFDM symbol period (defined below). The modulation symbols to be transmitted on the $N_S$ subbands in each OFDM symbol period are transformed to the time-domain using an inverse fast Fourier transform (IFFT) to obtain a "transformed" symbol that contains $N_S$ samples. The input to an $N_S$-point IFFT is $N_S$ frequency-domain values and the output from the IFFT is $N_S$ time-domain samples. The number of subbands is determined by the size of the IFFT. Increasing the size of the IFFT increases the number of subbands and also increases the number of samples for each transformed symbol, which correspondingly increases the time required to transmit the symbol.

To combat frequency selective fading in the wireless channel used for data transmission (described below), a portion of each transformed symbol is typically repeated prior to transmission. The repeated portion is often referred to as a cyclic prefix, and has a length of $N_{CP}$ samples. The length of the cyclic prefix is typically selected based on the delay spread of the system, as described below, and is independent of the length of the transformed symbol. An OFDM symbol is composed of a transformed symbol and its cyclic prefix. Each OFDM symbol contains $N_S+N_{cp}$ samples and has a duration of $N_S+N_{cp}$ sample periods, which is one OFDM symbol period.

The size of the cyclic prefix relative to that of the OFDM symbol may have a large impact on the efficiency of an OFDM system. The cyclic prefix must be transmitted with each OFDM symbol to simplify the receiver processing in a multipath environment but carries no additional information. The cyclic prefix may be viewed as bandwidth that must be wasted as a price of operating in the multipath environment. The proportion of bandwidth wasted in this way can be computed using the formula $$\frac{N_{cp}}{N_S + N_{cp}}.$$

For example, if $N_{cp}$ is 16 samples and $N_S$ is 64 samples, then 20% of the bandwidth is lost to cyclic prefix overhead. This percentage may be decreased by using a relatively large value of $N_S$. Unfortunately, using a large value of $N_S$ can also lead to inefficiency, especially where the size of the information unit or packet to be transmitted is much smaller than the capacity of the OFDM symbol. For example, if each OFDM symbol can carry 480 information bits, but the most common packet contains 96 bits, then packing efficiency will be poor and much of the capacity of the OFDM symbol will be wasted when this common packet is sent.

Orthogonal frequency division multiple-access (OFDMA) can ameliorate the inefficiency due to excess capacity resulting from the use of a large OFDM symbol. For OFDMA, multiple users share the large OFDM symbol using frequency domain multiplexing. This is achieved by reserving a set of subbands for signaling and allocating different disjoint sets of subbands to different users. However, data transmission using OFDMA may be complicated by various factors such as, for example, different power requirements, propagation delays, Doppler frequency shifts, and/or timing for different users sharing the large OFDM symbol.

Existing OFDM systems typically select a single OFDM symbol size that is a compromise of various objectives, which may include minimizing cyclic prefix overhead and maximizing packing efficiency. The use of this single OFDM symbol size results in inefficiency due to excess capacity when transmitting packets of varying sizes. There is therefore a need in the art for an OFDM system that operates efficiently when transmitting packets of varying sizes.

SUMMARY

Techniques are provided herein to use OFDM symbols of different sizes to achieve greater efficiency for OFDM systems. These techniques can address both objectives of minimizing cyclic prefix overhead and maximizing packing efficiency. The OFDM symbol sizes may be selected based on the expected sizes of the different types of payload to be transmitted in an OFDM system. The system traffic may be arranged into different categories. For each category, one or more OFDM symbols of the proper sizes may be selected for use based on the expected payload size for the traffic in that category.

For example, the system traffic may be arranged into control data, user data, and pilot data. Control data may be transmitted using an OFDM symbol of a first size, user data may be transmitted using an OFDM symbol of a second size and the OFDM symbol of the first size, and pilot data may be transmitted using an OFDM symbol of a third size (or the first size). The user data may further be arranged into sub-categories such as, for example, voice data, packet data, messaging data, and so on. A particular OFDM symbol size may then be selected for each sub-category of user data. Alternatively or additionally, the data for each user may be transmitted using an OFDM symbol of a particular size selected for that user. For improved packing efficiency, OFDM symbols of different sizes may be used for a given user data packet to better match the capacity of the OFDM symbols to the packet payload.

In general, any number of OFDM symbol sizes may be used for an OFDM system, and any particular OFDM symbol size may be selected for use. In one illustrative design, a combination of two OFDM symbol sizes are used so as to maximize packing efficiency. In the illustrative design, a small or short OFDM symbol size (e.g., with 64 subbands) is used for pilot and control data. User data may be sent within zero or more OFDM symbols having a large or long OFDM symbol size (e.g., with 256 subbands) and zero or more OFDM symbols having the small OFDM symbol size, depending on the payload size.

The processing at a transmitter and receiver (e.g., encoding, interleaving, symbol mapping, and spatial processing) may be performed in a manner to account for the use of OFDM symbols of different sizes, as described below. Various aspects and embodiments of the invention are also described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIG. 2 shows OFDM symbols of different sizes and the overhead due to the cyclic prefix;

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
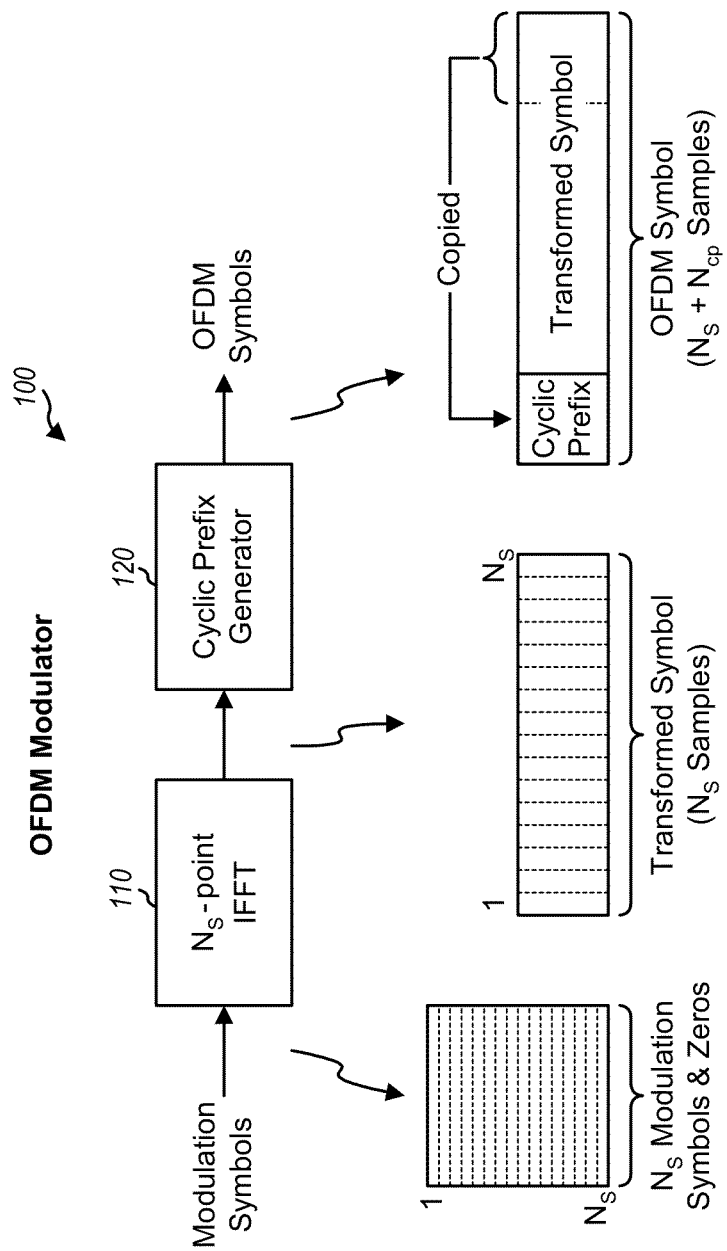
FIG. 1 shows a block diagram of an OFDM modulator.

FIG. 1 shows a block diagram of an OFDM modulator 100 that may be used in an OFDM system. The data to be transmitted (i.e., the information bits) is typically first encoded in an encoder (not shown) using a particular coding scheme to generate code bits. For example, the encoder (not shown) may utilize a forward error correction (FEC) code such as a block code, convolutional code, or turbo code. The code bits are then grouped into B-bit binary values, where $B \geq 1$. Each B-bit value is then mapped to a specific modulation symbol based on a particular modulation scheme (e.g., M-PSK or M-QAM, where $M=2^B$). Each modulation symbol is a complex value in a signal constellation corresponding to the modulation scheme used for that modulation symbol.

For each OFDM symbol period, one modulation symbol may be transmitted on each subband used for data transmission, and a signal value of zero is provided for each unused subband. An inverse fast Fourier transform (IFFT) unit 110 transforms the $N_S$ modulation symbols and zeros for all $N_S$ subbands in each OFDM symbol period to the time domain using an inverse fast Fourier transform (IFFT), to obtain a transformed symbol that comprises $N_S$ samples.

A cyclic prefix generator 120 then repeats a portion of each transformed symbol to obtain a corresponding OFDM symbol that comprises $N_S+N_{cp}$ samples. The cyclic prefix is used to combat frequency selective fading (i.e., a frequency response that varies across the overall system bandwidth), which is caused by delay spread in the system. The delay spread for a transmitter is the difference between the earliest and latest arriving signal instances at a receiver for a signal transmitted by that transmitter. The delay spread of the system is the expected worst-case delay spread for all transmitters and receivers in the system. The frequency selective fading causes inter-symbol interference (ISI), which is a phenomenon whereby each symbol in a received signal acts as distortion to subsequent symbols in the received signal. The ISI distortion degrades performance by impacting the ability to correctly detect the received symbols. To effectively combat ISI, the length of the cyclic prefix is typically selected based on the delay spread of the system such that the cyclic prefix contains a significant portion of all multipath energies. The cyclic prefix represents a fixed overhead of $N_{cp}$ samples for each OFDM symbol.

FIG. 2 illustrates OFDM symbols of different sizes including the fixed overhead due to the cyclic prefix. For a given system bandwidth of W MHz, the size or duration of an OFDM symbol is dependent on the number of subbands. If the system bandwidth is divided into N subbands with the use of an N-point IFFT, then the resulting transformed symbol comprises N samples and spans N sample periods or N/W μsec. As shown in FIG. 2, the system bandwidth may also be divided into 2N subbands with the use of a 2N-point IFFT. In this case, the resulting transformed symbol would comprise 2N samples, span 2N sample periods, and have approximately twice the data-carrying capacity of the transformed symbol with N samples. Similarly, FIG. 2 also shows how the system bandwidth may be divided into 4N subbands with the use of a 4N-point IFFT. The resulting transformed symbol would then comprise 4N samples and have approximately four times the data-carrying capacity of the transformed symbol with N samples.

As illustrated in FIG. 2, since the cyclic prefix is a fixed overhead, it becomes a smaller percentage of the OFDM symbol as the symbol size increases. Viewed another way, only one cyclic prefix is needed for the transformed symbol of size 4N, whereas four cyclic prefixes are needed for the equivalent four transformed symbols of size N. The amount of overhead for the cyclic prefixes may then be reduced by 75% by the use of the large OFDM symbol of size 4N. (The terms "large" and "long" are used interchangeably herein for OFDM symbols, and the terms "small" and "short" are also used interchangeably.) FIG. 2 indicates that improved efficiency (from the cyclic prefix standpoint) may be attained by using an OFDM symbol with the largest size possible. The largest OFDM symbol that may be used is typically constrained by the coherence time of the wireless channel, which is the time over which the wireless channel is essentially constant.

The use of the largest possible OFDM symbol may be inefficient from other standpoints. In particular, if the data-carrying capacity of the OFDM symbol is much greater than the size of the payload to be sent, then the remaining excess capacity of the OFDM symbol will go unused. This excess capacity of the OFDM symbol represents inefficiency. If the OFDM symbol is too large, then the inefficiency due to excess-capacity may be greater than the inefficiency due to the cyclic prefix.

In an illustrative OFDM system, both types of inefficiency are minimized by using OFDM symbols of different sizes. The OFDM symbol sizes used to transmit a unit of data may be selected from a set of available OFDM symbol sizes, which may in turn be selected based on the expected sizes of the different types of payload to be transmitted in the OFDM system. The system traffic may be arranged into different categories. For each category, one or more OFDM symbols of the proper sizes may be selected for use based on the expected payload size for the traffic in that category and possibly other considerations (e.g., implementation complexity). An OFDM symbol may be viewed as a boxcar that is used to send data. One or more boxcars of the proper sizes may be selected for each category of data depending on the amount of data expected to be sent for that category. A unit of data may be sent using multiple boxcars having identical sizes or having varying sizes. For example, if a unit of data consumes 2.1 times the capacity of a "large" boxcar, then the unit of data may be sent using two "large" boxcars and one "small" boxcar.

As an example, the system traffic may be divided into three basic categories—control data, user data, and pilot data. Control data typically constitutes a small fraction (e.g., less than 10%) of the total system traffic and is usually sent in smaller blocks. User data constitutes the bulk of the system traffic. To minimize cyclic prefix overhead and maximize packing efficiency, a short OFDM symbol may be used to send control data and pilot, and a combination of long OFDM symbols and short OFDM symbols may be used to send user data.

Figure 3A:
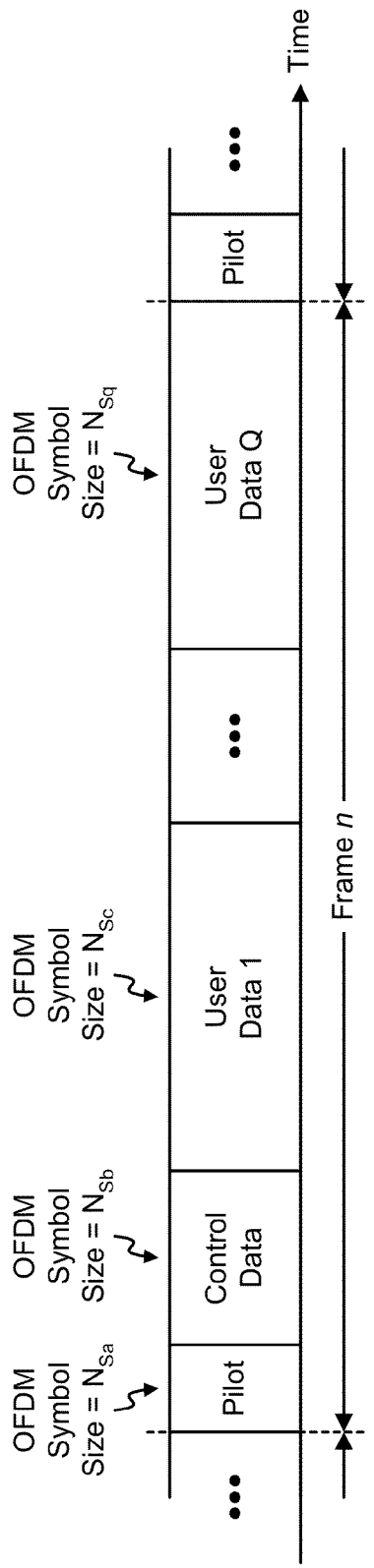
FIGS. 3A and 3B show the use of OFDM symbols of different sizes to transmit different types of data.

FIG. 3A shows the use of OFDM symbols of different sizes to transmit different types of data in an OFDM system. For simplicity, only one OFDM symbol size is used for each category and type of data in FIG. 3A. In general, any number of OFDM symbol sizes may be used for each category and type of data.

As shown in FIG. 3A, pilot data may be transmitted using an OFDM symbol of size $N_{Sa}$, control data may be transmitted using an OFDM symbol of size $N_{Sb}$, and different types of user data (or data for different users) may be transmitted using OFDM symbols of sizes $N_{Sc}$ through $N_{Sq}$. The user data may be further arranged into sub-categories such as, for example, voice data, packet data, messaging data, and so on. A suitable OFDM symbol size may then be selected for each sub-category of user data. Alternatively, the data for each user may be transmitted using an OFDM symbol of a suitable size for that user. The OFDM symbol size for a particular user may be selected based on various considerations such as, for example, the amount of data to transmit, the coherence time of the wireless channel for the user, and so on.

In general, any number of OFDM symbol sizes may be used for the OFDM system, and any particular OFDM symbol size may be selected for use. Typically, the minimum OFDM symbol size is dictated by the cyclic prefix overhead and the maximum OFDM symbol size is dictated by the coherence time of the wireless channel. For practical considerations, OFDM symbol sizes that are powers of two (e.g., 32, 64, 128, 256, 512, and so on) are normally selected for use because of the ease in transforming between the time and frequency domains with the IFFT and fast Fourier Transform (FFT) operations.

FIG. 3A shows the transmission of different types of data in different time segments in a time division multiplexed (TDM) manner. Each frame (which is of a particular time duration) is partitioned into multiple time segments. Each time segment may be used to transmit data of a particular type. The different types of data may also be transmitted in other manners, and this is within the scope of the invention. For example, the pilot and control data may be transmitted on different sets of sub-bands in the same time segment. As another example, all user data may be transmitted in one time segment for each frame.

For a TDM frame structure, such as the one shown in FIG. 3A, the particular OFDM symbol size to use for each time segment may be determined by various manners. In one embodiment, the OFDM symbol size to use for each time segment is fixed and known a priori by both the transmitters and receivers in the OFDM system. In another embodiment, the OFDM symbol size for each time segment may be configurable and indicated, for example, by signaling sent for each frame. In yet another embodiment, the OFDM symbol sizes for some time segments (e.g., for the pilot and control data) may be fixed and the OFDM symbol sizes for other time segments (e.g., for the user data) may be configurable. In the latter configuration, the transmitter may use the fixed-symbol-size control data channel to transmit the OFDM symbol sizes to be used in subsequent user-data OFDM symbols.

Figure 3B:
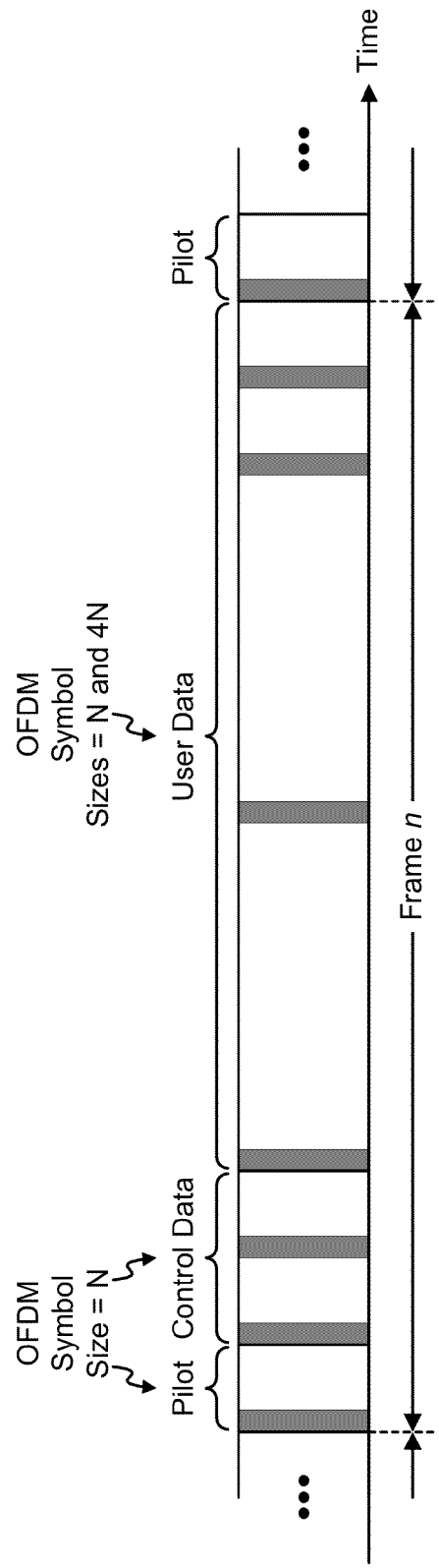

FIG. 3B shows the use of two different OFDM symbol sizes of N and 4N for different types of data. In this embodiment, each frame is partitioned into three time segments for pilot, control data, and user data. Pilot and control data are transmitted using an OFDM symbol of size N, and user data is transmitted using an OFDM symbol of size 4N and the OFDM symbol of size N. One or multiple OFDM symbols of size N may be transmitted for each of the time segments for pilot and control data. Zero or multiple OFDM symbols of size 4N and zero or multiple OFDM symbols of size N may be transmitted for the time segment for user data.

Figure 4:
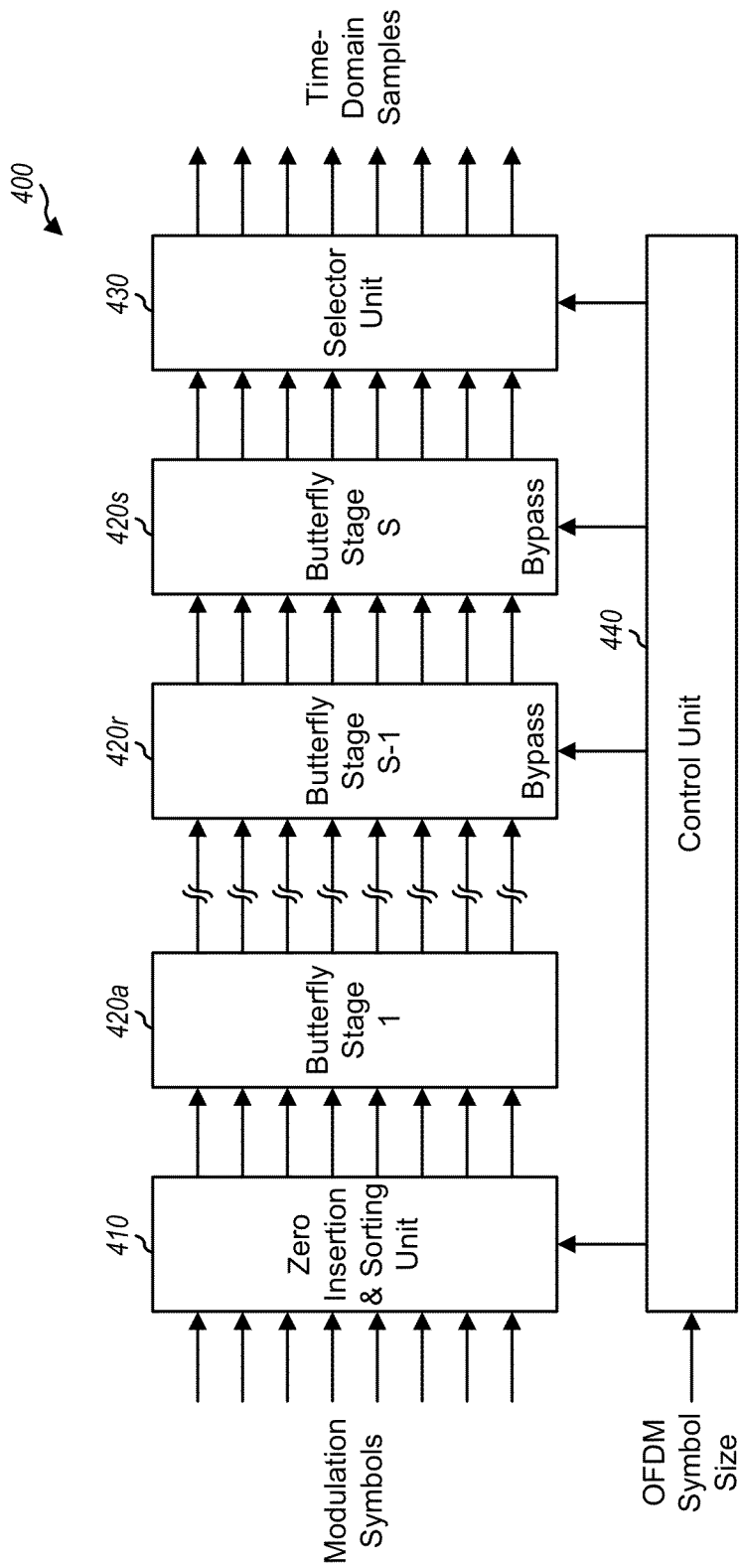
FIG. 4 shows an IFFT unit with S stages for generating OFDM symbols of different sizes.

FIG. 4 shows an embodiment of a variable-size IFFT unit 400 capable of generating OFDM symbols of different sizes. IFFT unit 400 includes S stages, where $S=\log_2 N_{max}$ and $N_{max}$ is the size of the largest OFDM symbol to be generated. The modulation symbols for each OFDM symbol period are provided to a zero insertion and sorting unit 410, which sorts the modulation symbols, for example in bit-reversed order, and inserts an appropriate number of zeros when a smaller OFDM symbol is being generated. Unit 410 provides $N_{max}$ sorted modulation symbols and zeros to a first butterfly stage 420a, which performs a set of butterfly computations for 2-point inverse discrete Fourier transforms (DFTs). The outputs from first butterfly stage 420a are then processed by each of subsequent butterfly stages 420b through 420s. Each butterfly stage 420 performs a set of butterfly operations with a set of coefficients applicable for that stage, as is known in the art.

The outputs from last butterfly stage 420s are provided to a selector unit 430, which provides the time-domain samples for each OFDM symbol. To perform an $N_{max}$-point IFFT, all butterfly stages are enabled and $N_{max}$ samples are provided by selector unit 430. To perform an $N_{max}/2$-point IFFT, all but the last butterfly stage 420s are enabled and $N_{max}/2$ samples are provided by selector unit 430. To perform an $N_{max}/4$-point IFFT, all but the last two butterfly stages 420r and 420s are enabled and $N_{max}/4$ samples are provided by selector unit 430. A control unit 440 receives an indication of the particular OFDM symbol size to use for the current OFDM symbol period and provides the control signals for units 410 and 430 and butterfly stages 420.

IFFT unit 400 may implement a decimation-in-time or a decimation-in-frequency IFFT algorithm. Moreover, IFFT unit 400 may implement radix-4 or radix-2 IFFT, although radix-4 IFFT may be more efficient. IFFT unit 400 may be designed to include one or multiple butterfly computation units. At the extremes, one butterfly computation unit may be used for a time-shared IFFT implementation, and $N_{max}$/radix butterfly computation units may be used for a fully parallel IFFT implementation. Typically, the number of butterfly computation units required is determined by the clock speed for these units, the OFDM symbol rate, and the maximum IFFT size. Proper control of these butterfly computation units in conjunction with memory management allow IFFT of different sizes to be performed using a single IFFT unit.

As described above in FIG. 1, a cyclic prefix generator 120 repeats a portion of each transformed symbol output by selector unit 430 to provide a cyclic prefix for each OFDM symbol. The same cyclic prefix length may be used for OFDM symbols of different sizes and may be selected based on the delay spread of the system as described above. The cyclic prefix length may also be configurable. For example, the cyclic prefix length used for each receiver may be selected based on the delay spread of the receiver, which may be shorter than the delay spread of the system. The configured cyclic prefix length may be signaled to the receiver or made known to the receiver by some other means.

OFDM symbols of different sizes may be advantageously used in various types of OFDM systems. For example, multiple OFDM symbol sizes may be used for (1) single-input single-output OFDM systems that use a single antenna for transmission and reception, (2) multiple-input single-output OFDM systems that use multiple antennas for transmission and a single antenna for reception, (3) single-input multiple-output OFDM systems that use a single antenna for transmission and multiple antennas for reception, and (4) multiple-input multiple-output OFDM systems (i.e., MIMO-OFDM systems) that use multiple antennas for transmission and reception. Multiple OFDM symbol sizes may also be used for (1) frequency division duplexed (FDD) OFDM systems that use different frequency bands for the downlink and uplink, and (2) time division duplexed (TDD) OFDM systems that use one frequency band for both the downlink and uplink in a time-shared manner.

The use of OFDM symbols of different sizes in an exemplary TDD MIMO-OFDM system is described below.

I. TDD MIMO-OFDM System

Figure 5:
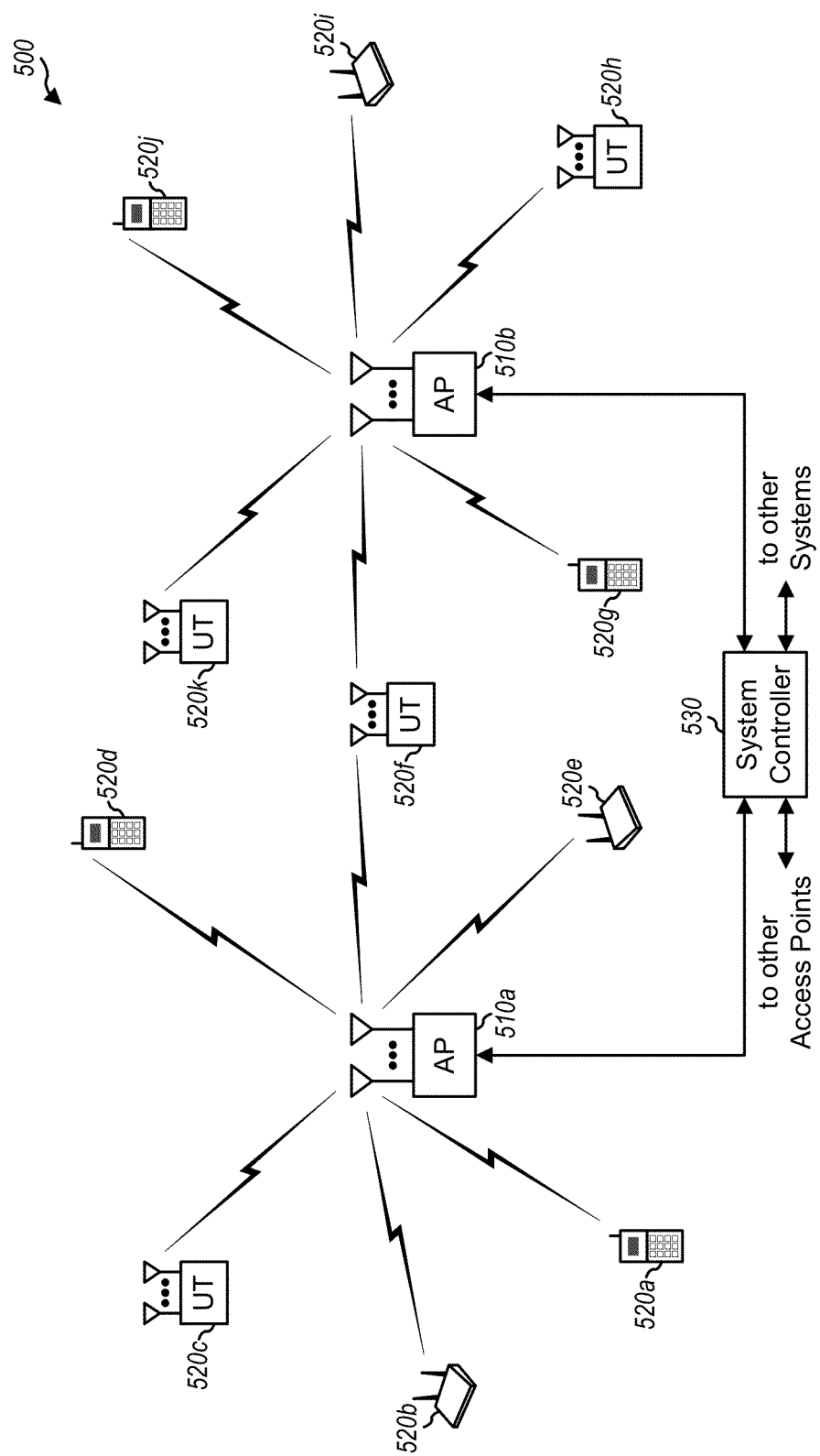
FIG. 5 shows an illustrative MIMO-OFDM system.

FIG. 5 shows an exemplary MIMO-OFDM system 500 with a number of access points (APs) 510 that support communication for a number of user terminals (UTs) 520. For simplicity, only two access points 510a and 510b are shown in FIG. 5. An access point is a fixed station used for communicating with the user terminals and may also be referred to as a base station or some other terminology. A user terminal may also be referred to as an access terminal, a mobile station, a user equipment (UE), a wireless device, or some other terminology. User terminals 520 may be dispersed throughout the system. Each user terminal may be a fixed or mobile terminal and may communicate with one or possibly multiple access points on the downlink and/or uplink at any given moment. The downlink (i.e., forward link) refers to the communication link from the access point to the user terminal, and the uplink (i.e., reverse link) refers to the communication link from the user terminal to the access point.

In FIG. 5, access point 510a communicates with user terminals 520a through 520f, and access point 510b communicates with user terminals 520f through 520k. A system controller 530 couples to access points 510 and may be designed to perform a number of functions such as (1) coordination and control for the access points coupled to it, (2) routing of data among these access points, and (3) access and control of communication with the user terminals served by these access points.

Figure 6:
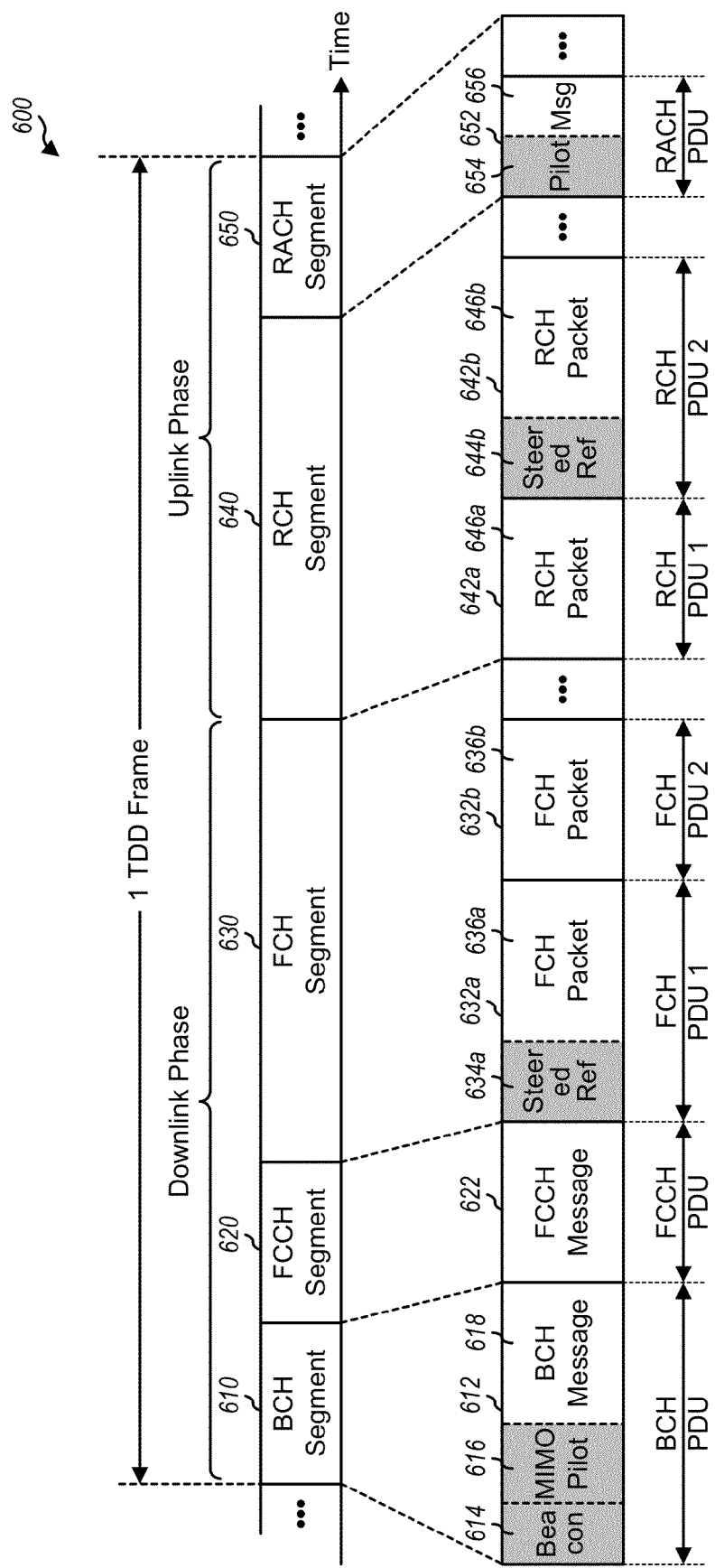
FIG. 6 shows a frame structure for a TDD MIMO-OFDM system.

FIG. 6 shows an exemplary frame structure 600 that may be used for MIMO-OFDM system 500. Data transmission occurs in units of TDD frames, each of which spans a particular time duration (e.g., 2 msec). Each TDD frame is partitioned into a downlink phase and an uplink phase, and each downlink or uplink phase is further partitioned into multiple segments for multiple transport channels. In the embodiment shown in FIG. 6, the downlink transport channels include a broadcast channel (BCH), a forward control channel (FCCH), and a forward channel (FCH), and the uplink transport channels include a reverse channel (RCH) and a random access channel (RACH).

On the downlink, a BCH segment 610 is used to transmit one BCH protocol data unit (PDU) 612, which includes a portion 614 for a beacon pilot, a portion 616 for a MIMO pilot, and a portion 618 for a BCH message. The BCH message carries system parameters for the user terminals in the system. An FCCH segment 620 is used to transmit one FCCH PDU, which carries assignments for downlink and uplink resources and other signaling for the user terminals. An FCH segment 630 is used to transmit one or more FCH PDUs 632 on the downlink. Different types of FCH PDU may be defined. For example, an FCH PDU 632a includes a portion 634a for a pilot (e.g., a steered reference) and a portion 636a for a data packet. The pilot portion is also referred to as a "preamble". An FCH PDU 632b includes a single portion 636b for a data packet. The different types of pilots (beacon pilot, MIMO pilot, and steered reference) are described in the aforementioned provisional U.S. Patent Application Ser. No. 60/421,309.

On the uplink, an RCH segment 640 is used to transmit one or more RCH PDUs 642 on the uplink. Different types of RCH PDU may also be defined. For example, an RCH PDU 642a includes a single portion 646a for a data packet. An RCH PDU 642b includes a portion 644b for a pilot (e.g., a steered reference) and a portion 646b for a data packet. An RACH segment 650 is used by the user terminals to gain access to the system and to send short messages on the uplink. An RACH PDU 652 may be sent in RACH segment 650 and includes a portion 654 for a pilot (e.g., a steered reference) and a portion 656 for a message.

The durations of the portions and segments are not drawn to scale in FIG. 6. The frame structure and transport channels shown in FIG. 6 are described in detail in the aforementioned provisional U.S. Patent Application Ser. No. 60/421,309.

Since different transport channels may be associated with different types of data, a suitable OFDM symbol size may be selected for use for each transport channel. If a large amount of data is expected to be transmitted on a given transport channel, then a large OFDM symbol may be used for that transport channel. The cyclic prefix would then represent a smaller percentage of the large OFDM symbol, and greater efficiency may be achieved. Conversely, if a small amount of data is expected to be transmitted on a given transport channel, than a small OFDM symbol may be used for that transport channel. Even though the cyclic prefix represents a larger percentage of the small OFDM symbol, greater efficiency may still be achieved by reducing the amount of excess capacity.

Thus, to attain higher efficiency, the OFDM symbol size for each transport channel may be selected to match the expected payload size for the type of data to be transmitted on that transport channel. Different OFDM symbol sizes may be used for different transport channels. Moreover, multiple OFDM symbol sizes may be used for a given transport channel. For example, each PDU type for the FCH and RCH may be associated with a suitable OFDM symbol size for that PDU type. A large OFDM symbol may be used for a large-size FCH/RCH PDU type, and a small OFDM symbol may be used for a small-size FCH/RCH PDU type.

For simplicity, an exemplary design is described below using a small OFDM symbol size $N_{S1}=64$ and a large OFDM symbol size $N_{S2}=256$. In this exemplary design, the BCH, FCCH, and RACH utilize the small OFDM symbol, and the FCH and RCH utilize both the small and large OFDM symbols as appropriate. Other OFDM symbol sizes may also be used for the transport channels, and this is within the scope of the invention. For example, a large OFDM symbol of size $N_{S3}=128$ may alternatively or additionally be used for the FCH and RCH.

For this exemplary design, the 64 subbands for the small OFDM symbol are assigned indices of −32 to +31. Of these 64 subbands, 48 subbands (e.g., with indices of $\pm\{1, \ldots, 6, 8, \ldots, 20, 22, \ldots, 26\}$) are used for data and are referred to as data subbands, 4 subbands (e.g., with indices of $\pm\{7, 21\}$) are used for pilot and possibly signaling, the DC subband (with index of 0) is not used, and the remaining subbands are also not used and serve as guard subbands. This OFDM subband structure is described in the aforementioned provisional U.S. Patent Application Ser. No. 60/421,309.

The 256 subbands for the large OFDM symbol are assigned indices of −128 to +127. The subbands for the small OFDM symbol may be mapped to the subbands for the large OFDM symbol based on the following:

$$l = 4k + i, \quad \text{Eq (1)}$$

where k is an index for the subbands in the short OFDM symbol (k=−32, . . . +31);
i is an index offset with a range of i=0, 1, 2, 3; and
l is an index for the subbands in the long OFDM symbol (l=−128, . . . +127).

For this exemplary design, the system bandwidth is W=20 MHz, the cyclic prefix is $N_{cp1}=16$ samples for the BCH, FCCH, and RACH, and the cyclic prefix is configurable as $N_{cp2}=8$ or 16 for the FCH and RCH. The small OFDM symbol used for the BCH, FCCH, and RACH would then have a size of $N_{os1}=80$ samples or 4.0 μsec. If $N_{cp2}=16$ is selected for use, then the large OFDM symbol used for the FCH and RCH would then have a size of $N_{os2}=272$ samples or 13.6 μsec.

For this exemplary design, the BCH segment has a fixed duration of 80 μsec, and each of the remaining segments has a variable duration. For each TDD frame, the start of each PDU sent on the FCH and RCH relative to the start of the FCH and RCH segments and the start of the RACH segment relative to the start of the TDD frame are provided in the FCCH message sent in the FCCH segment. Different OFDM symbol sizes are associated with different symbol durations. Since different OFDM symbol sizes are used for different transport channels (and different OFDM symbol sizes may also be used for the same transport channel), the offsets for the FCH and RCH PDUs are specified with the proper time resolution. For the exemplary design described above, the time resolution may be the cyclic prefix length of 800 nsec. For a TDD frame of 2 msec, a 12-bit value may be used to indicate the start of each FCH/RCH PDU.

Figure 7:
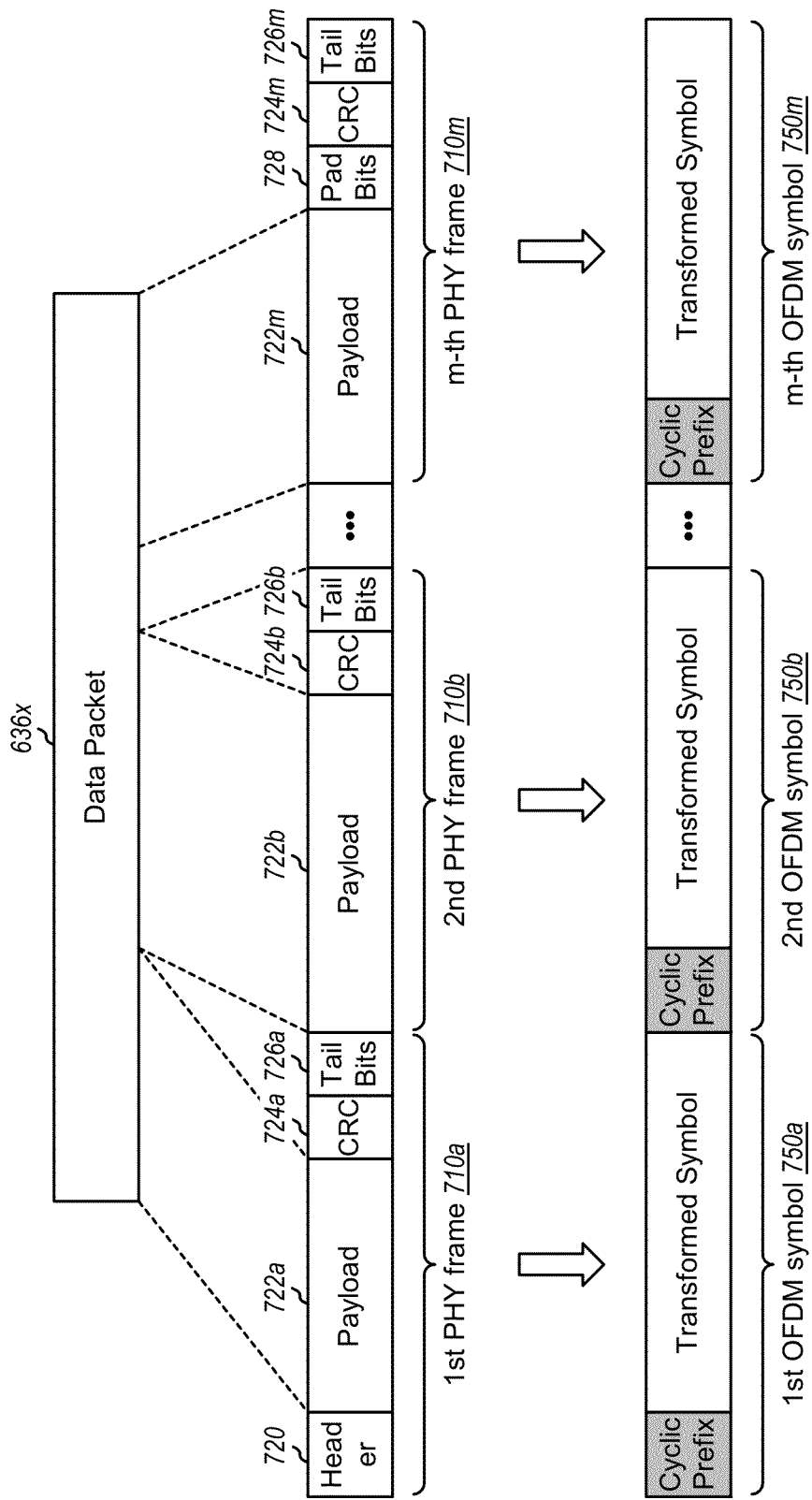
FIG. 7 shows a structure for a data packet and a PHY frame.

FIG. 7 illustrates an exemplary structure for a data packet 636x that may be sent in an FCH or RCH PDU on the FCH or RCH. The data packet is sent using an integer number of PHY frames 710. Each PHY frame 710 includes a payload field 722 that carries the data for the PHY frame, a CRC field 724 for a CRC value for the PHY frame, and a tail bit field 726 for a set of zeros used to flush out the encoder. The first PHY frame 710a for the data packet further includes a header field 720, which indicates the message type and duration. The last PHY frame 710m for the data packet further includes a pad bit field 728, which contains zero padding bits at the end of the payload in order to fill the last PHY frame. This PHY frame structure is described in further detail in the aforementioned provisional U.S. Patent Application Ser. No. 60/421,309. If one antenna is used for data transmission, then each PHY frame 710 may be processed to obtain one OFDM symbol 750.

The same PHY frame structure may be used for a message sent on the BCH or FCCH. In particular, a BCH/FCCH message may be sent using an integer number of PHY frames, each of which may be processed to obtain one OFDM symbol. Multiple OFDM symbols may be transmitted for the BCH/FCCH message.

For the embodiment shown in FIG. 7, one PHY frame of data is sent in each OFDM symbol. Different PHY frame sizes may be used for different OFDM symbol sizes. Each PHY frame of data may be coded based on a particular coding scheme and may further include a CRC value that permits individual PHY frames to be checked and retransmitted if necessary. The number of information bits that may be sent in each PHY frame is dependent on the coding and modulation schemes selected for use for that PHY frame. Table 1 lists a set of rates that may be used for the MIMO-OFDM system and, for each rate, various parameters for two PHY frame sizes for two OFDM symbol sizes of $N_{S1}=64$ and $N_{S2}=256$.

TABLE 1

| Spectral Efficiency (bps/Hz) | Code Rate | Modulation Scheme | Small PHY Frame | | Large PHY Frame | |
|---|---|---|---|---|---|---|
| | | | Info bits/ PHY frame | Code bits/ PHY frame | Info bits/ PHY frame | Code bits/ PHY frame |
| 0.25 | 1/4 | BPSK | 12 | 48 | 48 | 192 |
| 0.5 | 1/2 | BPSK | 24 | 48 | 96 | 192 |
| 1.0 | 1/2 | QPSK | 48 | 96 | 192 | 384 |
| 1.5 | 3/4 | QPSK | 72 | 96 | 288 | 384 |
| 2.0 | 1/2 | 16 QAM | 96 | 192 | 384 | 768 |
| 2.5 | 5/8 | 16 QAM | 120 | 192 | 480 | 768 |
| 3.0 | 3/4 | 16 QAM | 144 | 192 | 576 | 768 |
| 3.5 | 7/12 | 64 QAM | 168 | 288 | 672 | 1152 |
| 4.0 | 2/3 | 64 QAM | 192 | 288 | 768 | 1152 |
| 4.5 | 3/4 | 64 QAM | 216 | 288 | 864 | 1152 |
| 5.0 | 5/6 | 64 QAM | 240 | 288 | 960 | 1152 |
| 5.5 | 11/16 | 256 QAM | 264 | 384 | 1056 | 1536 |
| 6.0 | 3/4 | 256 QAM | 288 | 384 | 1152 | 1536 |
| 6.5 | 13/16 | 256 QAM | 312 | 384 | 1248 | 1536 |
| 7.0 | 7/8 | 256 QAM | 336 | 384 | 1344 | 1536 |

For the exemplary design described above, the small PHY frame and small OFDM symbol are used for the BCH and FCCH. Both small and large PHY frames and small and large OFDM symbols may be used for the FCH and RCH. In general, a data packet may be sent using any number of large OFDM symbols and a small number of small OFDM symbols. If the large OFDM symbol is four times the size of the small OFDM symbol, then a data packet may be sent using $N_L$ large OFDM symbols and $N_{SM}$ small OFDM symbols (where $N_L \geq 0$ and $3 \geq N_{SM} \geq 0$). The $N_{SM}$ small OFDM symbols at the end of the $N_L$ large OFDM symbols reduce the amount of unused capacity. OFDM symbols of different sizes may thus be used to better match the capacity of the OFDM symbols to the packet payload to maximize packing efficiency.

The OFDM symbol sizes used for data transmission may be provided to a receiver in various manners. In one embodiment, the FCCH provides the start of each data packet transmitted on the FCH and RCH and the rate of the packet. Some other equivalent information may also be signaled to the receiver. The receiver is then able to determine the size of each data packet being sent, the number of long and short OFDM symbols used for that data packet, and the start of each OFDM symbol. This information is then used by the receiver to determine the size of the FFT to be performed for each received OFDM symbol and to properly align the timing of the FFT. In another embodiment, the start of each data packet and its rate are not signaled to the receiver. In this case, "blind" detection may be used, and the receiver can perform an FFT for every 16 samples (i.e., the cyclic prefix length) and determine whether or not a PHY frame was sent by checking the CRC value included in the PHY frame.

For a given pairing of access point and user terminal in MIMO-OFDM system 500, a MIMO channel is formed by the $N_{ap}$ antennas at the access point and the $N_{ut}$ antennas at the user terminal. The MIMO channel may be decomposed into $N_C$ independent channels, with $N_C \leq \min\{N_{ap}, N_{ut}\}$. Each of the $N_C$ independent channels is also referred to as an eigenmode of the MIMO channel, where "eigenmode" normally refers to a theoretical construct. Up to $N_C$ independent data streams may be sent concurrently on the $N_C$ eigenmodes of the MIMO channel. The MIMO channel may also be viewed as including $N_C$ spatial channels that may be used for data transmission. Each spatial channel may or may not correspond to an eigenmode, depending on whether or not the spatial processing at the transmitter was successful in orthogonalizing the data streams.

The MIMO-OFDM system may be designed to support a number of transmission modes. Table 2 lists the transmission modes that may be used for the downlink and uplink for a user terminal equipped with multiple antennas.

TABLE 2

| Transmission modes | Description |
|---|---|
| Diversity | Data is redundantly transmitted from multiple transmit antennas and subbands to provide diversity. |
| Beam-steering | Data is transmitted on a single (best) spatial channel at full power using the phase steering information based on the principal eigenmode of the MIMO channel. |
| Spatial multiplexing | Data is transmitted on multiple spatial channels to achieve higher spectral efficiency. |

For the beam-steering mode, one PHY frame of a selected rate may be generated for each OFDM symbol period for transmission on the best spatial channel. This PHY frame is initially processed to obtain a set of modulation symbols, which is then spatially processed to obtain $N_T$ sets of transmit symbols for $N_T$ transmit antennas. The set of transmit symbols for each antenna is further processed to obtain an OFDM symbol for that antenna.

For the spatial multiplexing mode, up to $N_C$ PHY frames of the same or different rates may be generated for each OFDM symbol period for transmission on the $N_C$ spatial channels. The up to $N_C$ PHY frames are initially processed to obtain up to $N_C$ sets of modulation symbols, which are then spatially processed to obtain $N_T$ sets of transmit symbols for $N_T$ transmit antennas. The set of transmit symbols for each antenna is further processed to obtain an OFDM symbol for that antenna.

The processing at the transmitter and receiver for the beam-steering and spatial multiplexing modes are described in detail in the aforementioned provisional U.S. Patent Application Ser. No. 60/421,309. The spatial processing for the beam-steering and spatial multiplexing modes is essentially the same for both the short and long OFDM symbols, albeit with more subbands for the long OFDM symbol. The diversity mode is described below.

In an embodiment, the diversity mode utilizes space-time transmit diversity (STTD) for dual transmit diversity on a per-subband basis. STTD supports simultaneous transmission of independent symbol streams on two transmit antennas while maintaining orthogonality at the receiver.

The STTD scheme operates as follows. Suppose that two modulation symbols, denoted as $s_1$ and $s_2$, are to be transmitted on a given subband. The transmitter generates two vectors or STTD symbols, $x_1=[s_1\ s_2^*]^T$ and $x_2=[s_2\ -s_1^*]^T$, where each STTD symbol includes two elements, "*" denotes the complex conjugate, and "T" denotes the transpose. Alternatively, the transmitter may generate two STTD symbols, $x_1=[s_1\ s_2]^T$ and $x_2=[-s_2^*\ s_1^*]^T$. In any case, the two elements in each STTD symbol are typically transmitted sequentially in two OFDM symbol periods from a respective transmit antenna (i.e., STTD symbol $x_1$ is transmitted from antenna 1 in two OFDM symbol periods, and STTD symbol $x_2$ is transmitted from antenna 2 in the same two OFDM symbol periods). The duration of each STTD symbol is thus two OFDM symbol periods.

It is desirable to minimize the processing delay and buffering associated with STTD processing for the large OFDM symbol. In an embodiment, the two STTD symbols $x_1$ and $x_2$ are transmitted concurrently on a pair of subbands from two antennas. For the two STTD symbols $x_1=[s_1\ s_2]^T$ and $x_2=[-s_2^*\ s_1^*]^T$, the two elements $s_1$ and $s_2$ for the STTD symbol $x_1$ may be transmitted on subband k from two antennas, and the two elements $-s_2^*$, and $s_1^*$ for the STTD symbol $x_2$ may be transmitted on subband k+1 from the same two antennas.

If the transmitter includes multiple antennas, then different pairs of antennas may be selected for use for each data subband in the diversity mode. Table 3 lists an exemplary subband-antenna assignment scheme for the STTD scheme using four transmit antennas.

TABLE 3

| Short OFDM Subband Indices | TX Ant | Bit Index |
|---|---|---|
| — | — | — |
| −26 | 1.2 | 0 |
| −25 | 3.4 | 6 |
| −24 | 1.3 | 12 |
| −23 | 2.4 | 18 |
| −22 | 1.4 | 24 |
| −21 | 1 | P0 |

TABLE 3-continued

| Short OFDM Subband Indices | TX Ant | Bit Index |
|---|---|---|
| −20 | 2,3 | 30 |
| −19 | 1,2 | 36 |
| −18 | 3,4 | 42 |
| −17 | 1,3 | 2 |
| −16 | 2,4 | 8 |
| −15 | 1,4 | 14 |
| −14 | 2,3 | 20 |
| −13 | 1,2 | 26 |
| −12 | 3,4 | 32 |
| −11 | 1,3 | 38 |
| −10 | 2,4 | 44 |
| −9 | 1,4 | 4 |
| −8 | 2,3 | 10 |
| −7 | 2 | P1 |
| −6 | 1,2 | 16 |
| −5 | 3,4 | 22 |
| −4 | 1,3 | 28 |
| −3 | 2,4 | 34 |
| −2 | 1,4 | 40 |
| −1 | 2,3 | 46 |
| 0 | | |
| 1 | 3,4 | 1 |
| 2 | 1,2 | 7 |
| 3 | 2,4 | 13 |
| 4 | 1,3 | 19 |
| 5 | 2,3 | 25 |
| 6 | 1,4 | 31 |
| 7 | 3 | P2 |
| 8 | 3,4 | 37 |
| 9 | 1,2 | 43 |
| 10 | 2,4 | 3 |
| 11 | 1,3 | 9 |
| 12 | 2,3 | 15 |
| 13 | 1,4 | 21 |
| 14 | 3,4 | 27 |
| 15 | 1,2 | 33 |
| 16 | 2,4 | 39 |
| 17 | 1,3 | 45 |
| 18 | 2,3 | 5 |
| 19 | 1,4 | 11 |
| 20 | 3,4 | 17 |
| 21 | 4 | P3 |
| 22 | 1,2 | 23 |
| 23 | 2,4 | 29 |
| 24 | 1,3 | 35 |
| 25 | 2,3 | 41 |
| 26 | 1,4 | 47 |

For the embodiment shown in Table 3, transmit antennas 1 and 2 are used for short OFDM subband with index −26, transmit antennas 3 and 4 are used for short OFDM subband with index −25, and so on. The subband-antenna assignment is such that (1) each of the six possible antenna pairings with four transmit antennas is used for 8 data subbands, which are uniformly distributed across the 48 data subbands, and (2) the antenna pairing to subband assignment is such that different antennas are used for adjacent subbands, which may provide greater frequency and spatial diversity. The subband-antenna assignment scheme shown in Table 3 may also be used for the long OFDM symbol based on the mapping shown in equation (1) between the short and long OFDM symbol subband indices. For example, transmit antennas 1 and 2 may be used for long OFDM subbands with indices {−104, −103, −102, −101}, which are associated with short OFDM subband with index −26.

The processing at the transmitter and receiver for the diversity mode is described in detail in the aforementioned provisional U.S. Patent Application Ser. No. 60/421,309.

1. Physical Layer Processing

Figure 8:
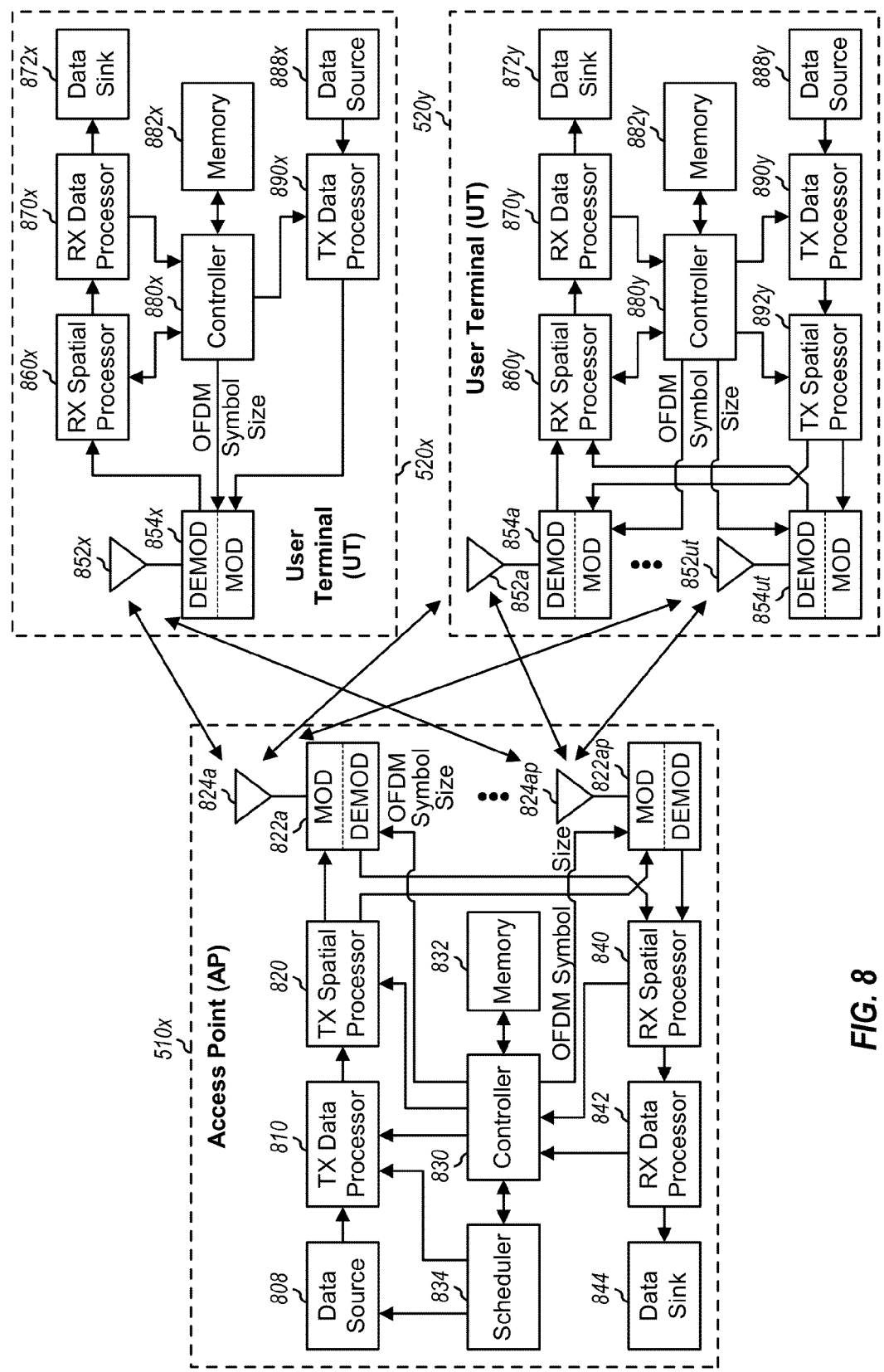
FIG. 8 shows a block diagram of an access point and two user terminals.

FIG. 8 shows a block diagram of an embodiment of an access point 510*x* and two user terminals 520*x* and 520*y* within MIMO-OFDM system 500.

On the downlink, at access point 510*x*, a transmit (TX) data processor 810 receives user data (i.e., information bits) from a data source 808 and control data and other data from a controller 830 and possibly a scheduler 834. The functions of the controller 830 and the scheduler 834 may be performed by a single processor or multiple processors. These various types of data may be sent on different transport channels. TX data processor 810 processes the different types of data based on one or more coding and modulation schemes and provides a stream of modulation symbols for each spatial channel to be used for data transmission. A TX spatial processor 820 receives one or more modulation symbol streams from TX data processor 810 and performs spatial processing on the modulation symbols to provide one stream of "transmit" symbols for each transmit antenna. The processing by processors 810 and 820 is described below.

Each modulator (MOD) 822 receives and processes a respective transmit symbol stream to provide a corresponding stream of OFDM symbols, which is further processed to provide a corresponding downlink signal. The downlink signals from $N_{ap}$ modulators 822*a* through 822*ap* are then transmitted from $N_{ap}$ antennas 824*a* through 824*ap*, respectively.

At each user terminal 520, one or multiple antennas 852 receive the transmitted downlink signals, and each antenna provides a receiver input signal to a respective demodulator (DEMOD) 854. Each demodulator 854 performs processing complementary to that performed at modulator 822 and provides "received" symbols. A receive (RX) spatial processor 860 then performs spatial processing on the received symbols from all demodulators 854 to provide "recovered" symbols, which are estimates of the modulation symbols sent by the access point.

An RX data processor 870 receives and demultiplexes the recovered symbols into their respective transport channels. The recovered symbols for each transport channel may be processed to provide decoded data for that transport channel. The decoded data for each transport channel may include recovered user data, control data, and so on, which may be provided to a data sink 872 for storage and/or a controller 880 for further processing.

The processing by access point 510 and terminal 520 for the downlink is described in further detail below and in the aforementioned provisional U.S. Patent Application Ser. No. 60/421,309. The processing for the uplink may be the same or different from the processing for the downlink.

For the downlink, at each active user terminal 520, RX spatial processor 860 further estimates the downlink channel and provides channel state information (CSI). The CSI may include channel response estimates, received SNRs, and so on. RX data processor 870 may also provide the status of each packet/frame received on the downlink. A controller 880 receives the channel state information and the packet/frame status and determines the feedback information to be sent back to the access point. Controller 880 may further process the downlink channel estimates to obtain steering vectors, which are used to transmit a steered reference to the access point and for spatial processing of downlink data reception and uplink data transmission. The feedback information and uplink data are processed by a TX data processor 890, multiplexed with pilot data and spatially processed by a TX spatial processor 892 (if present), conditioned by one or more modulators 854, and transmitted via one or more antennas 852 back to the access point.

At access point 510, the transmitted uplink signal(s) are received by antennas 824, demodulated by demodulators 822, and processed by an RX spatial processor 840 and an RX data processor 842 in a complementary manner to that performed at the user terminal. The recovered feedback information is then provided to controller 830 and a scheduler 834. Scheduler 834 may use the feedback information to perform a number of functions such as (1) selecting a set of user terminals for data transmission on the downlink and uplink, (2) selecting the rates for the selected user terminals, and (3) assigning the available FCH/RCH resources to the selected terminals. Controller 830 may further use information (e.g., steering vectors) obtained from the uplink transmission for the processing of the downlink transmission, as described below.

Controllers 830 and 880 control the operation of various processing units at the access point and the user terminal, respectively. For example, controller 830 may determine the payload size of each data packet sent on the downlink and select OFDM symbols of the proper sizes for each downlink data packet. Correspondingly, controller 880 may determine the payload size of each data packet sent on the uplink and select OFDM symbols of the proper sizes for each uplink data packet.

The OFDM symbol size selection may be performed for the downlink and uplink in various manners. In one embodiment, controller 830 and/or scheduler 834 determines the specific OFDM symbol sizes to use for both the downlink and uplink. In another embodiment, the controller at the transmitter determines the specific OFDM symbol sizes to use for transmission. The OFDM symbol size selection may then be provided to the receiver (e.g., via signaling on an overhead channel or signaling within the transmission itself). In yet another embodiment, the controller at the receiver determines the specific OFDM symbol sizes to use for transmission, and the OFDM symbol size selection is provided to the transmitter. The OFDM symbol size selection may be provided in various forms. For example, the specific OFDM symbol sizes to use for a given transmission may be derived from scheduling information for that transmission, which may include, for example, the transmission mode, spatial channels, rate, and time interval to use for the transmission. The scheduling information may be generated by controller 830 and/or scheduler 834, the controller at the transmitter, or the controller at the receiver.

For both the downlink and uplink, the specific combination of large and small OFDM symbols to use for each data packet is dependent on the packet payload size and the OFDM symbol capacity for each of the available OFDM symbol sizes. For each data packet, the controller may select as many large OFDM symbols as needed, and where appropriate select one or more additional small OFDM symbols for the data packet. This selection may be performed as follows. Assume that two OFDM symbol sizes are used (e.g., with 64 subbands and 256 subbands), the data carrying capacity of the small OFDM symbol is $T_{SM}=48$ modulation symbols, and the capacity of the large OFDM symbol is $T_L=192$ modulation symbols. The modulation and coding scheme allows M information bits to be sent per modulation symbol. The capacity of the small OFDM symbol is then $C_{SM}=48 \cdot M$ information bits, and the capacity of the large OFDM symbol is $C_L=192 \cdot M$ information bits. Let the data packet be $N_P$ bits in length. The controller computes two intermediate values, l and m, as follows:

$$l=int[N_P/C_L], \text{ and} \qquad \text{Eq (2)}$$

$$m=ceiling[(N_P-l \cdot C_L)/C_{SM}], \qquad \text{Eq (3)}$$

where the "int" operation on a provides the integer value of a, and the "ceiling" operation on b provides the next higher integer value for b. If m<4, then the number of large OFDM symbols to use for the data packet is $N_L=l$ and the number of small OFDM symbols to use is $N_{SM}=m$. Otherwise, if m=4, then the number of large OFDM symbols to use for the data packet is $N_L=l+1$ and the number of small OFDM symbols to use is $N_{SM}=0$.

Controllers 830 and 880 provide the OFDM symbol size control signals to modulators/demodulators 822 and 854, respectively. At the access point, the OFDM symbol size control signal is used by the modulators to determine the size of the IFFT operations for downlink transmission, and is also used by the demodulators to determine the size of the FFT operations for uplink transmission. At the user terminal, the OFDM symbol size control signal is used by the demodulator(s) to determine the size of the FFT operations for downlink transmission, and is also used by the modulator(s) to determine the size of the IFFT operations for uplink transmission. Memory units 832 and 882 store data and program codes used by controllers 830 and 880, respectively.

Figure 9A:
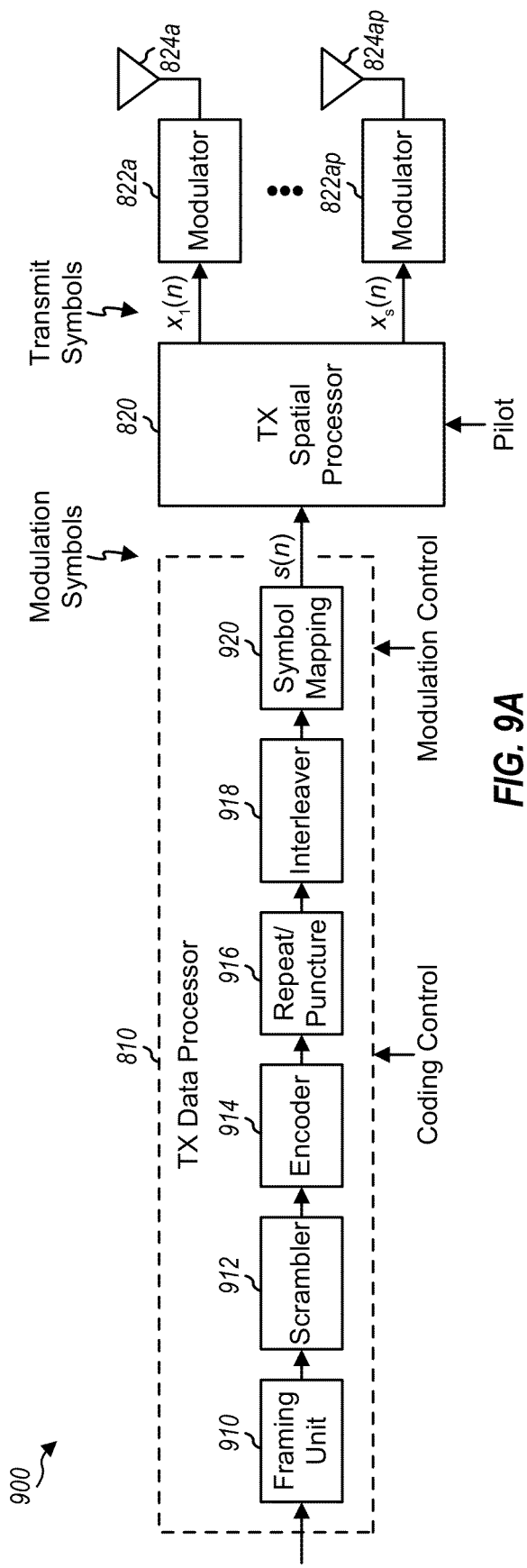
FIG. 9A shows a block diagram of a transmitter unit that may be used for the access point and the user terminal.

FIG. 9A shows a block diagram of an embodiment of a transmitter unit 900 that may be used for the transmitter portion of the access point and the user terminal. Within TX data processor 810, a framing unit 910 "frames" the data for each packet to be transmitted on the FCH or RCH. The framing may be performed as illustrated in FIG. 7 to provide one or more PHY frames for each user data packet. The framing may be omitted for other transport channels. A scrambler 912 then scrambles the framed/unframed data for each transport channel to randomize the data.

An encoder 914 then codes the scrambled data in accordance with a selected coding scheme to provide code bits. The encoding increases the reliability of the data transmission. A repeat/puncture unit 916 then either repeats or punctures (i.e., deletes) some of the code bits to obtain the desired code rate for each PHY frame. In an exemplary embodiment, encoder 914 is a rate ½, constraint length 7, binary convolutional encoder. A code rate of ¼ may be obtained by repeating each code bit once. Code rates greater than ½ may be obtained by deleting some of the code bits from encoder 914.

An interleaver 918 then interleaves (i.e., reorders) the code bits from unit 916 based on a particular interleaving scheme. The interleaving provides time, frequency, and/or spatial diversity for the code bits. In an embodiment, each group of 48 consecutive code bits to be transmitted on a given spatial channel is interleaved across the 48 data subbands for the short OFDM symbol to provide frequency diversity. For the interleaving, the 48 code bits in each group may be assigned indices of 0 through 47. Each code bit index is associated with a respective short OFDM subband. Table 3 shows an exemplary code bit-subband assignment that may be used for the interleaving. All code bits with a particular index are transmitted on the associated subband. For example, the first code bit (with index 0) in each group is transmitted on short OFDM subband −26, the second code bit (with index 1) is transmitted on subband 1, and so on.

For the long OFDM symbol, each group of 192 consecutive code bits to be transmitted on a given spatial channel is interleaved across the 192 data subbands for the long OFDM symbol. In particular, the first subgroup of 48 code bits with indices of 0 through 47 may be transmitted on the 48 data subbands with indices l=4k, where k=±{1 . . . 6, 8 . . . 20, 22 . . . 26}, the second subgroup of 48 code bits with indices of 48 through 95 may be transmitted on the subbands with indices l=4k+1, the third subgroup of 48 code bits with indices of 96 through 143 may be transmitted on the subbands with indices l=4k+2, and the last subgroup of 48 code bits with indices of 144 through 191 may be transmitted on the subbands with indices l=4k+3. The same interleaving scheme is thus essentially used for both the short and long OFDM symbols.

A symbol mapping unit 920 then maps the interleaved data in accordance with one or more modulation schemes to provide modulation symbols. As shown in Table 1, the specific modulation scheme to use is dependent on the selected rate. The same modulation scheme is used for all data subbands in the diversity mode. A different modulation scheme may be used for each spatial channel in the spatial multiplexing mode. The symbol mapping may be achieved by (1) grouping sets of B bits to form B-bit binary values, where B≥1, and (2) mapping each B-bit binary value to a point in a signal constellation corresponding to the selected modulation scheme. Symbol mapping unit 920 provides a stream of modulation symbols to TX spatial processor 920.

An exemplary design for framing unit 910, scrambler 912, encoder 914, repeat/puncture unit 916, interleaver 918, and symbol mapping unit 920 is described in the aforementioned provisional U.S. Patent Application Ser. No. 60/421,309. The scrambling, coding, and modulation may be performed based on control signals provided by controller 830.

TX spatial processor 820 receives the modulation symbols from TX data processor 810 and performs spatial processing for the spatial multiplexing, beam-steering, or diversity mode. The spatial processing is described in the aforementioned provisional U.S. Patent Application Ser. No. 60/421, 309. TX spatial processor 820 provides one stream of transmit symbols to each of $N_{ap}$ modulators 822a through 822ap.

Figure 9B:
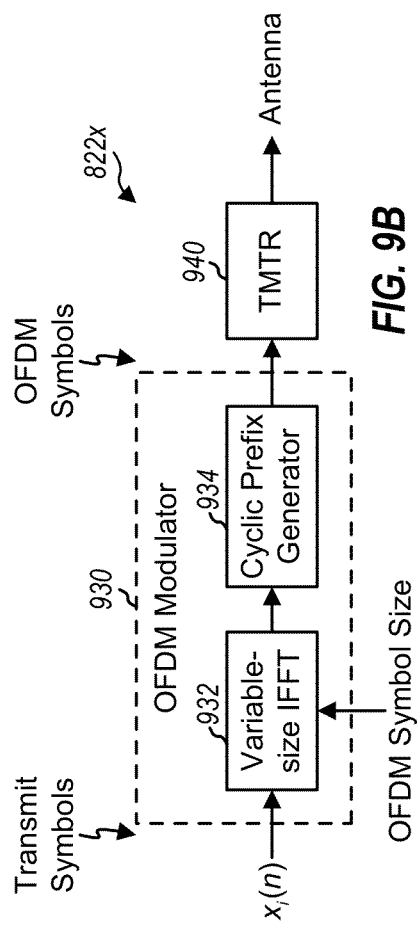
FIG. 9B shows a block diagram of a modulator within the transmitter unit.

FIG. 9B shows a block diagram of an embodiment of a modulator 822x, which may be used for each of modulators 822a through 822ap in FIG. 9A. Modulator 822x includes an OFDM modulator 930 coupled to a transmitter unit (TMTR) 940. OFDM modulator 930 includes a variable-size IFFT unit 932 coupled to a cyclic prefix generator 934. IFFT unit 932 may be implemented with IFFT unit 400 shown in FIG. 4. IFFT unit 932 performs N-point IFFTs on the stream of transmit symbols provided to modulator 822x, where N is variable and determined by the OFDM symbol size control signal provided by controller 830. For example, controller 830 may select the small OFDM symbol size for the BCH and FCCH segments (as shown in FIG. 6) and may select a combination of the small and large OFDM symbol sizes for the FCH segment, as described above. Cyclic prefix generator 934 appends a cyclic prefix to each transformed symbol from IFFT unit 932. The output of cyclic prefix generator 934 is a stream of OFDM symbols having varying sizes, as determined by controller 830. Transmitter unit 940 converts the stream of OFDM symbols into one or more analog signals, and further amplifies, filters, and frequency upconverts the analog signals to generate a downlink signal suitable for transmission from an associated antenna 824.

2. Pilot

Various types of pilots may be transmitted to support various functions, such as timing and frequency acquisition, channel estimation, calibration, and so on. Table 4 lists four types of pilot and their short description.

TABLE 4

| Pilot Type | Description |
|---|---|
| Beacon Pilot | A pilot transmitted from all transmit antennas and used for timing and frequency acquisition. |
| MIMO Pilot | A pilot transmitted from all transmit antennas with different orthogonal codes and used for channel estimation. |

TABLE 4-continued

| Pilot Type | Description |
|---|---|
| Steered Reference | A pilot transmitted on specific eigenmodes of a MIMO channel for a specific user terminal and used for channel estimation and possibly rate control. |
| Carrier Pilot | A pilot used for phase tracking of a carrier signal. |

A MIMO pilot may be sent by a transmitter (e.g., an access point) with the short OFDM symbol and used by a receiver (e.g., a user terminal) to estimate the channel response matrices H(k), for subband indices k∈K, where K=±{1 ... 26}. The receiver may then perform singular value decomposition of the channel response matrix H(k) for each subband, as follows:

$$H(k)=U(k)\Sigma(k)V^H(k), \text{ for } k \in K, \quad \text{Eq (4)}$$

where U(k) is an ($N_T \times N_R$) unitary matrix of left eigenvectors of H(k);
 $\Sigma(k)$ is an ($N_R \times N_T$) diagonal matrix of singular values of H(k);
 V(k) is an ($N_T \times N_T$) unitary matrix of right eigenvectors of H(k); and
 "H" denotes the conjugate transpose, $N_T$ denotes the number of transmit antennas, and $N_R$ denotes the number of receive antennas.

A unitary matrix M is characterized by the property $M^H M = I$, where I is the identity matrix. The singular values in each diagonal matrix $\Sigma(k)$ may be ordered from largest to smallest, and the columns in the matrices U(k) and V(k) may be ordered correspondingly.

A "wideband" eigenmode may be defined as the set of same-order eigenmodes of all subbands after the ordering. Thus, wideband eigenmode m includes eigenmode m of all subbands. Each wideband eigenmode is associated with a respective set of eigenvectors for all of the subbands. The "principal" wideband eigenmode is the one associated with the largest singular value in each matrix $\Sigma(k)$ after the ordering.

If the same frequency band is used for both the downlink and uplink, then the channel response matrix for one link is the transpose of the channel response matrix for the other link. Calibration may be performed to account for differences in the frequency responses of the transmit/receive chains at the access point and user terminal. A steered reference may be sent by a transmitter and used by a receiver to estimate the eigenvectors that may be used for spatial processing for data reception and transmission.

A steered reference may be transmitted for wideband eigenmode m by a transmitter (e.g., a user terminal), as follows:

$$x_m(k)=v_m(k) \cdot p(k), \text{ for } k \in K, \quad \text{Eq (5)}$$

where $x_m(k)$ is an ($N_T \times 1$) transmit vector for subband k of wideband eigenmode m;
 $v_m(k)$ is the steering vector for subband k of wideband eigenmode m (i.e., the m-th column of the matrix V(k); and
 p(k) is the pilot symbol for subband k.

The vector $x_m(k)$ includes $N_T$ transmit symbols to be sent from the $N_T$ transmit antennas for subband k.

The received steered reference at a receiver (e.g., an access point) may be expressed as:

$$r_m(k) = H(k)x_m(k) + n(k), \text{ for } k \in K. \quad \text{Eq (6)}$$
$$= u_m(k)\sigma_m(k)p(k) + n(k)$$

where $r_m(k)$ is a received vector for subband k of wideband eigenmode m;

$u_m(k)$ is the steering vector for subband k of wideband eigenmode m (i.e., the m-th column of the matrix U(k); and $\sigma_m(k)$ is the singular value for subband k of wideband eigenmode m; and n(k) is the noise.

As shown in equation (6), at the receiver, the received steered reference (in the absence of noise) is approximately $u_m(k)\sigma_m(k)p(k)$. The receiver can thus obtain estimates of $u_m(k)$ and $\sigma_m(k)$ for subband k based on the steered reference received on that subband, as described in the aforementioned provisional U.S. Patent Application Ser. No. 60/421,309.

The steered reference is sent for one wideband eigenmode in each OFDM symbol period (without subband multiplexing), and may in turn be used to obtain an estimate of one eigenvector $u_m(k)$ for each subband of that wideband eigenmode. Since estimates of multiple eigenvectors for the unitary matrix U(k) are obtained over different OFDM symbol periods, and due to noise and other sources of degradation in the wireless channel, the estimated eigenvectors for the unitary matrix (which are individually derived) are not likely to be orthogonal to one another. To improve performance, the $N_C$ estimated eigenvectors $u_m(k)$ of each unitary matrix U(k) may be forced to be orthogonal to each other using QR factorization or some other orthogonalization technique, as described in the aforementioned provisional U.S. Patent Application Ser. No. 60/438,601.

The steered reference may be sent using the short OFDM symbol. The receiver is able to process the received steered reference to obtain a steering vector for each short OFDM subband that was used for steered reference transmission. For the above exemplary design, each short OFDM subband is associated with four long OFDM subbands. If the steered reference is sent using the short OFDM symbol, then the steering vectors for the long OFDM subbands may be obtained in various manners.

In one embodiment, the steering vector obtained for short OFDM subband k is used for long OFDM subbands l=4k through l=4k+3. This embodiment provides good performance for low to moderate SNRs. For high SNRs, some degradation is observed when the coherence bandwidth of the channel is small. The coherence bandwidth is the bandwidth over which the channel is essentially constant or flat.

In another embodiment, the steering vectors $u_m(k)$ obtained for the short OFDM subbands are interpolated to obtain the steering vectors $u_m(l)$ for the long OFDM subbands. The interpolation may be performed in a manner such that the steering vectors $u_m(l)$ do not exhibit substantially more variability from subband to subband than the underlying channel response matrix H(k). One source of variability is phase ambiguity in the left and right eigenvectors of H(k), which results from the fact that the left and right eigenvectors of H(k) are unique up to a unit length complex constant. In particular, for any pair of unit length vectors $v_m(k)$ and $u_m(k)$ that satisfy the following equation:

$$H(k)v_m(k)=u_m(k)\sigma_m(k), \quad \text{Eq (7)}$$

any other pair of unit length vectors $e^{j\phi}v_m(k)$ and $e^{j\phi}u_m(k)$ also satisfy the equation.

This phase ambiguity may be avoided by taking some precautions in the computation of the singular value decomposition of H(k). This may be achieved by constraining the solution to the singular value decomposition so that the first element in each column of V(k) is non-negative. This constraint eliminates arbitrary phase rotations from subband to subband when the variations in the eigenvectors are otherwise smooth and the magnitude of the leading element of the eigenvector is not close to zero. This constraint may be enforced by post-multiplying a diagonal matrix R(k) with each of the unitary matrices U(k) and V(k), which may be obtained in the normal manner and may contain arbitrary phase rotations. The diagonal elements $\rho_i(k)$ of the matrix R(k) may be expressed as:

$$\rho_i(k)=e^{-j\arg(v_{1,i}(k))}, \quad \text{Eq (8)}$$

where $v_{1,i}(k)$ is the first element of the i-th column of V(k), and $$\arg(v_{1,i}(k)) = \arctan\left(\frac{\text{Re}\{v_{1,i}(k)\}}{\text{Im}\{v_{1,i}(k)\}}\right).$$

The constrained eigenvectors in R(k)V(k) may then be used for the steered reference, as shown in equation (5). At the receiver, the received vector $r_m(k)$ may be processed to obtain estimates of $u_m(k)$ and $\sigma_m(k)$, which may be interpolated to obtain estimates of $u_m(l)$ and $\sigma_m(l)$, respectively.

The use of the short OFDM symbol for the MIMO pilot and steered reference reduces the processing load associated with singular value decomposition of the channel response matrices H(k). Moreover, it can be shown that interpolation, with the constraint described above to avoid arbitrary phase rotation from subband to subband, can reduce the amount of degradation in performance due to interpolation of the steering vectors based on steered reference transmission on fewer than all subbands used for data transmission.

The carrier pilot may be transmitted by the access point and used by the user terminals for phase tracking of a carrier signal. For a short OFDM symbol, the carrier pilot may be transmitted on four short OFDM subbands with indices±{7, 21}, as shown in Table 3. For a long OFDM symbol, the carrier pilot may be transmitted on the 16 corresponding long OFDM subbands with indices±{28+i, 84+i}, for i=0, 1, 2, 3. Alternatively, the carrier pilot may be transmitted on four long OFDM subbands with indices±{28, 84}, in which case the other 12 long OFDM subbands may be used for data transmission or some other purpose.

The various types of pilots and their processing at the transmitter and receiver are described in detail in the aforementioned provisional U.S. Patent Application Ser. No. 60/421,309.

For simplicity, the techniques for using of OFDM symbols of different sizes have been described for the downlink. These techniques may also be used for the uplink. A fixed OFDM symbol size may be used for some uplink transmissions (e.g., messages sent on the RACH) and OFDM symbols of different sizes may be used for other uplink transmissions (e.g., data packets sent on the RCH). The specific combination of large and small OFDM symbols to use for each uplink data packet may be depending on the packet payload size and may be determined by controller 880 (e.g., based on scheduling information generated by controller 880 or provided by controller 830 and/or scheduler 834, as described above).

The techniques described herein for using OFDM symbols of different sizes in OFDM systems may be implemented by various means. For example, these techniques may be implemented in hardware, software, or a combination thereof. For a hardware implementation, the elements used to implement any one or a combination of the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in a memory unit (e.g., memory units 832 and 882 in FIG. 8) and executed by a processor (e.g., controllers 830 and 880). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of transmitting data in an orthogonal frequency division multiplexing (OFDM) communication system from a transmitter device to one or more receiver devices, comprising:
    selecting a first number of one or more first OFDM symbols having a first data carrying capacity for carrying pilot data and a second number of one or more second OFDM symbols having a second data carrying capacity for carrying control data that is different from the first data carrying capacity, wherein the first OFDM symbols and second OFDM symbols have different symbol sizes;
    selecting, based on a payload size of data intended for at least a first user and a second user, at least a third number of third OFDM symbols having a third data carrying capacity for user data intended for the first user and a fourth number of fourth OFDM symbols having a fourth data carrying capacity for user data intended for the second user, wherein the third OFDM symbols and fourth OFDM symbols have different symbol sizes; and
    transmitting the data packet using the selected number of first OFDM symbols, the selected number of second OFDM symbols, the selected number of third OFDM symbols, and the selected number of fourth OFDM symbols,
    wherein the control data transmitted on the second OFDM symbols comprises information about the third data carrying capacity and symbol size of the third OFDM symbols and the fourth data carrying capacity and symbol size of the fourth OFDM symbols.

2. The method of claim 1, wherein the number of first OFDM symbols and the number of second OFDM symbols are selected to minimize an amount of excess data carrying capacity.

3. The method of claim 1, wherein:
    the OFDM communications system comprises a multiple-input multiple-output (MIMO) system; and
    transmitting the data packet comprises transmitting the data packet using multiple antennas.

4. The method of claim 1, wherein the third data carrying capacity of the third OFDM symbols and the fourth data carrying capacity of the fourth OFDM symbols are selected based, at least in part, on a category of data transmitted to the first and second users.

5. An apparatus for transmitting data in an orthogonal frequency division multiplexing (OFDM) communication system from a transmitter device to one or more receiver devices, comprising:
    an OFDM modulator configured to select a first number of one or more first OFDM symbols having a first data carrying capacity for carrying pilot data and a second number of one or more second OFDM symbols having a second data carrying capacity for carrying control data that is different from the first data carrying capacity, wherein the first OFDM symbols and second OFDM symbols have different symbol sizes, and to select, based on a payload size of data intended for at least a first user and a second user, at least a third number of third OFDM symbols having a third data carrying capacity for user data intended for the first user and a fourth number of fourth OFDM symbols having a fourth data carrying capacity for user data intended for the second user, wherein the third OFDM symbols and fourth OFDM symbols have different symbol sizes; and
    at least one transmitter configured to transmit the data packet using the selected number of first OFDM symbols, the selected number of second OFDM symbols, the selected number of third OFDM symbols, and the selected number of fourth OFDM symbols,
    wherein the control data transmitted on the second OFDM symbols comprises information about the third data carrying capacity and symbol size of the third OFDM symbols and the fourth data carrying capacity and symbol size of the fourth OFDM symbols.

6. The apparatus of claim 5, wherein the number of first OFDM symbols and the number of second OFDM symbols are selected to minimize an amount of excess data carrying capacity.

7. The apparatus of claim 5, wherein:
    the OFDM communications system comprises a multiple-input multiple-output (MIMO) system; and
    the at least one transmitter is configured to transmit the data packet using multiple antennas.

8. The apparatus of claim 5, wherein the OFDM modulator is configured to select the third data carrying capacity of the third OFDM symbols and the fourth data carrying capacity of the fourth OFDM symbols based, at least in part, on a category of data transmitted to the first and second users.

9. A program product for transmitting data in an orthogonal frequency division multiplexing (OFDM) communication system from a transmitter device to one or more receiver devices, comprising a non-transitory memory unit having codes stored thereon for:
    selecting a first number of one or more first OFDM symbols having a first data carrying capacity for carrying pilot data and a second number of one or more second OFDM symbols having a second data carrying capacity for carrying control data that is different from the first data carrying capacity, wherein the first OFDM symbols and second OFDM symbols have different symbol sizes;
    selecting, based on a payload size of data intended for at least a first user and a second user, at least a third number of third OFDM symbols having a third data carrying capacity for user data intended for the first user and a fourth number of fourth OFDM symbols having a fourth data carrying capacity for user data intended for the second user, wherein the third OFDM symbols and fourth OFDM symbols have different symbol sizes; and transmitting the data packet using the selected number of first OFDM symbols, the selected number of second OFDM symbols, the selected number of third OFDM symbols, and the selected number of fourth OFDM symbols, wherein the control data transmitted on the second OFDM symbols comprises information about the third data carrying capacity and symbol size of the third OFDM symbols and the fourth data carrying capacity and symbol size of the fourth OFDM symbols.

10. The program product of claim 9, wherein the number of first OFDM symbols and the number of second OFDM symbols are selected to minimize an amount of excess data carrying capacity.

11. The program product of claim 9, wherein:
the OFDM communications system comprises a multiple-input multiple-output system; and
transmitting the data packet comprises transmitting the data packet using multiple antennas.

12. The program product of claim 9, wherein the third data carrying capacity of the third OFDM symbols and the fourth data carrying capacity of the fourth OFDM symbols are selected based, at least in part, on a category of data transmitted to the first and second users.

* * * * *